(12) United States Patent
Holland et al.

(10) Patent No.: US 11,831,973 B2
(45) Date of Patent: Nov. 28, 2023

(54) CAMERA SETTING ADJUSTMENT BASED ON EVENT MAPPING

(71) Applicant: QUALCOMM Incorporated, San Diego, CA (US)

(72) Inventors: Wesley James Holland, Encinitas, CA (US); Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/395,348

(22) Filed: Aug. 5, 2021

(65) Prior Publication Data
US 2023/0038159 A1     Feb. 9, 2023

(51) Int. Cl.
| | |
|---|---|
| G06V 40/10 | (2022.01) |
| H04N 23/611 | (2023.01) |
| G06V 10/10 | (2022.01) |
| G06V 10/40 | (2022.01) |
| G06V 40/16 | (2022.01) |
| G06V 10/75 | (2022.01) |
| H04N 23/667 | (2023.01) |
| H04N 23/65 | (2023.01) |
| G06F 3/01 | (2006.01) |
| G01S 19/31 | (2010.01) |

(52) U.S. Cl.
CPC ........... *H04N 23/611* (2023.01); *G06F 3/012* (2013.01); *G06V 10/10* (2022.01); *G06V 10/40* (2022.01); *G06V 10/757* (2022.01); *G06V 40/11* (2022.01); *G06V 40/16* (2022.01); *H04N 23/651* (2023.01); *H04N 23/667* (2023.01); *G01S 19/31* (2013.01)

(58) Field of Classification Search
CPC ......... H04N 5/23219; H04N 5/232411; H04N 5/23245; G06F 3/012; G06V 10/40; G06V 10/757; G06V 40/10; G06V 40/11; G06V 40/16; G01S 19/31
See application file for complete search history.

(56) References Cited

U.S. PATENT DOCUMENTS

| | | | |
|---|---|---|---|
| 2017/0094171 A1 | 3/2017 | Lim et al. | |
| 2017/0339339 A1 | 11/2017 | De et al. | |
| 2017/0353699 A1 | 12/2017 | Wang | |
| 2018/0295428 A1* | 10/2018 | Bi | H04N 21/8153 |
| 2020/0263994 A1* | 8/2020 | Lee | G06T 7/74 |
| 2022/0164981 A1* | 5/2022 | Fujisawa | G06V 10/761 |
| 2022/0165054 A1* | 5/2022 | Olwal | H04N 5/23206 |

OTHER PUBLICATIONS

Partial International Search Report—PCT/US2022/074213—ISA/EPO—dated Oct. 24, 2022.
International Search Report and Written Opinion—PCT/US2022/074213—ISA/EPO—dated Dec. 23, 2022.

* cited by examiner

*Primary Examiner* — Tat C Chio
(74) *Attorney, Agent, or Firm* — QUALCOMM Incorporated

(57) ABSTRACT

Systems, methods, and non-transitory media are provided for adjusting camera settings based on event data. An example method can include obtaining, via an image capture device of a mobile device, an image depicting at least a portion of an environment; determining a match between one or more visual features extracted from the image and one or more visual features associated with a keyframe; and based on the match, adjusting one or more settings of the image capture device.

50 Claims, 9 Drawing Sheets

CAMERA SETTING ADJUSTMENT BASED ON EVENT MAPPING

TECHNICAL FIELD

The present disclosure generally relates to camera setting adjustments. For example, aspects of the present disclosure relate to camera setting adjustments based on event mapping.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, a person, an object, etc. The image or video can be captured and processed by the computing device (e.g., a mobile device, an IP camera, extended reality device, connected device, etc.) and stored or output for consumption (e.g., displayed on the device and/or another device). In some cases, the image or video can be further processed for effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

In some cases, an electronic device can process images to detect objects, faces, and/or any other items captured by the images. The object detection can be useful for various applications such as, for example, authentication, automation, gesture recognition, surveillance, extended reality, computer vision, among others. In some examples, the electronic device can implement a lower-power or "always-on" (AON) camera that persistently or periodically operates to automatically detect certain objects in an environment. The lower-power camera can be implemented for a variety of use cases such as, for example, persistent gesture detection, persistent object (e.g., face/person, animal, vehicle, device, plane, etc.) detection, persistent object scanning (e.g., quick response (QR) code scanning, barcode scanning, etc.), persistent facial recognition for authentication, etc. However, the persistent operation and/or more frequent operation of lower-power cameras and other camera setups can result in high overall power consumption. Moreover, mobile devices implementing such lower-power cameras can suffer from a reduced battery life, and stationary devices may demand more complex heat dissipation designs and/or exhibit an unacceptable low power efficiency during long term usage. Accordingly, a significantly higher power consumption can negatively impact use of the electronic device, the device's performance, and the user experience.

BRIEF SUMMARY

Systems and techniques are described herein for camera setting adjustments based on event mapping. According to at least one example, a method is provided for adjusting camera settings based on event data. The method can include obtaining, via an image capture device of an electronic device, an image depicting at least a portion of an environment; determining a match between one or more visual features extracted from the image and one or more visual features associated with a keyframe associated with one or more detection events; and based on the match, adjusting one or more settings of the image capture device.

According to at least one example, a non-transitory computer-readable medium is provided for adjusting camera settings based on event data. The non-transitory computer-readable medium can include instructions stored thereon which, when executed by one or more processors, cause the one or more processors to obtain, via an image capture device of an electronic device, an image depicting at least a portion of an environment; determine a match between one or more visual features extracted from the image and one or more visual features associated with a keyframe associated with one or more detection events; and based on the match, adjust one or more settings of the image capture device.

According to at least one example, an apparatus is provided for adjusting camera settings based on event data. The apparatus can include memory and one or more processors configured to obtain, via an image capture device of the apparatus, an image depicting at least a portion of an environment; determine a match between one or more visual features extracted from the image and one or more visual features associated with a keyframe associated with one or more detection events; and based on the match, adjust one or more settings of the image capture device.

According to at least one example, another apparatus is provided for adjusting camera settings based on event data. The apparatus can include means for obtaining, via an image capture device of the apparatus, an image depicting at least a portion of an environment; determining a match between one or more visual features extracted from the image and one or more visual features associated with a keyframe associated with one or more detection events; and based on the match, adjusting one or more settings of the image capture device.

In some aspects, the method, non-transitory computer-readable medium, and apparatuses described above can periodically decrease respective counts of detection events associated with keyframe entries in event data at the electronic device, the respective counts of detection events being proportionally decreased across all keyframe entries in the event data.

In some examples, adjusting the one or more settings of the image capture device can include modifying a power mode of the image capture device. In some cases, modifying the power mode of the image capture device can include modifying at least one of a framerate of the image capture device, a resolution of the image capture device, a binning mode of the image capture device, an imaging mode of the image capture device, and a number of image sensors invoked by at least one of the image capture device and the electronic device. In some examples, modifying the power mode of the image capture device can include, based on a determination that a likelihood of an event of interest occurring in the environment is below a threshold, decreasing at least one of the framerate, the resolution, the binning mode, the imaging mode, and the number of image sensors invoked. In some examples, modifying the power mode of the image capture device can include, based on a determination that a likelihood of an event of interest occurring in the environment is above a threshold, increasing at least one of the framerate, the resolution, the binning mode, the imaging mode, and the number of image sensors invoked.

In some examples, the image capture device can include a first image capture device, and the method, non-transitory computer-readable medium, and apparatuses described above can include, based on a determination that a likelihood of an event of interest occurring in the environment is above a threshold, increasing a power mode of a second image capture device of the electronic device, wherein the second image capture device employs at least one of a higher-power mode than the first image capture device, a higher framerate than the first image capture device, a higher resolution than the first image capture device, a higher number of image sensors than the first image capture device, and a higher-power processing pipeline than a processing pipeline associated with the first image capture device. In some examples, increasing the power mode of the second image capture device can include initializing the second image capture device.

In some cases, the keyframe is contained in event data at the electronic device, and the event data can contain a number of keyframes from detection events associated with the image capture device. In some cases, the event data further contains a respective count of detection events associated with each keyframe of the number of keyframes.

In some aspects, the method, non-transitory computer-readable medium, and apparatuses described above can include determining a likelihood of an event of interest occurring in the environment based on the match and one or more keyframes from the number of keyframes.

In some aspects, the method, non-transitory computer-readable medium, and apparatuses described above can include determining a likelihood of an event of interest occurring in the environment based on the match and the respective count of detection events associated with the keyframe.

In some aspects, the method, non-transitory computer-readable medium, and apparatuses described above can include, in response to determining the match between one or more visual features extracted from the image and one or more visual features associated with the keyframe, increasing the respective count of detection events associated with the keyframe in the event data.

In some aspects, the method, non-transitory computer-readable medium, and apparatuses described above can include obtaining, via the image capture device, a different image depicting at least a portion of a different environment; determining that one or more visual features extracted from the different image do not match visual features associated with any keyframe in event data at the electronic device; and creating a new entry in the event data corresponding to the different image, the new entry being created in response to determining that the one or more visual features extracted from the different image do not match visual features associated with any keyframe in the event data and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

In some aspects, the method, non-transitory computer-readable medium, and apparatuses described above can include determining that the event of interest was detected in the different image; based on the determination that the event of interest was detected in the different image, determining a second likelihood of an additional event of interest occurring in the different environment; and adjusting at least one setting of the image capture device based on the second likelihood of the additional event of interest occurring in the different environment.

In some cases, the one or more settings of the image capture device can include a framerate, and the method, non-transitory computer-readable medium, and apparatuses described above can include determining the framerate based on a pre-determined framerate for detection events and a likelihood of an event of interest occurring in the environment; and maintaining the framerate until at least an expiration of a configured period of time or a determination of a subsequent match between a different image captured by the image capture device and at least one keyframe in event data at the electronic device.

In some aspects, the method, non-transitory computer-readable medium, and apparatuses described above can include after expiration of the configured period of time or the determination of the subsequent match, adjusting the framerate of the image capture device to a different framerate. In some examples, the different framerate can include a default framerate or a particular framerate determined based on the pre-determined framerate and a second likelihood of detecting a particular event of interest associated with the subsequent match.

In some examples, the pre-determined framerate can include a highest framerate supported by the image capture device, and wherein determining the framerate can include multiplying the pre-determined framerate by a value corresponding to the likelihood of the detection event occurring in the environment.

In some examples, the pre-determined framerate is higher than the default framerate, and the method, non-transitory computer-readable medium, and apparatuses described above can include in response to adding one or more keyframes to event data at the electronic device, reducing the default framerate to a lower framerate.

In some cases, determining the match between one or more visual features extracted from the image and one or more visual features associated with the keyframe further can include comparing at least one of the one or more visual features extracted from the image with the one or more visual features associated with the keyframe and a first descriptor of the one or more visual features extracted from the image with a second descriptor of the one or more visual features associated with the keyframe.

In some aspects, the method, non-transitory computer-readable medium, and apparatuses described above can include based on a likelihood of an event of interest occurring in the environment, adjusting one or more different settings of at least one of an active depth transmitter of the electronic device, an audio algorithm, a location service associated with at least one of a global navigation satellite (GNSS) system, a wireless location area network connection, and a global positioning system (GPS).

In some examples, adjusting the one or more different settings can include turning off or implementing at least one of the active depth transmitter, the audio algorithm, and the location service.

In some examples, the one or more detection events can include a detection of at least one of a face depicted by the image, a hand gesture depicted by the image, an emotion depicted by the image, a scene depicted by the image, one or more people depicted by the image, an animal depicted by the image, a machine-readable code depicted by the image, an infrared light depicted by the image, a two-dimensional surface depicted by the image, and text depicted by the image. In some cases, the keyframe is part of the event data at the electronic device, and the event data includes a plurality of keyframes.

In some aspects, the method, non-transitory computer-readable medium, and apparatuses described above can include based on the match, determining a likelihood of an event of interest occurring in the environment; and adjusting the one or more settings of the image capture device further based on the likelihood of the event of interest occurring in the environment.

In some aspects, the method, non-transitory computer-readable medium, and apparatuses described above can include determining the likelihood of the event further based on data from a non-image capture device of the electronic device; or adjusting the one or more settings of the image capture device further based on the data from the non-image capture device of the electronic device.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
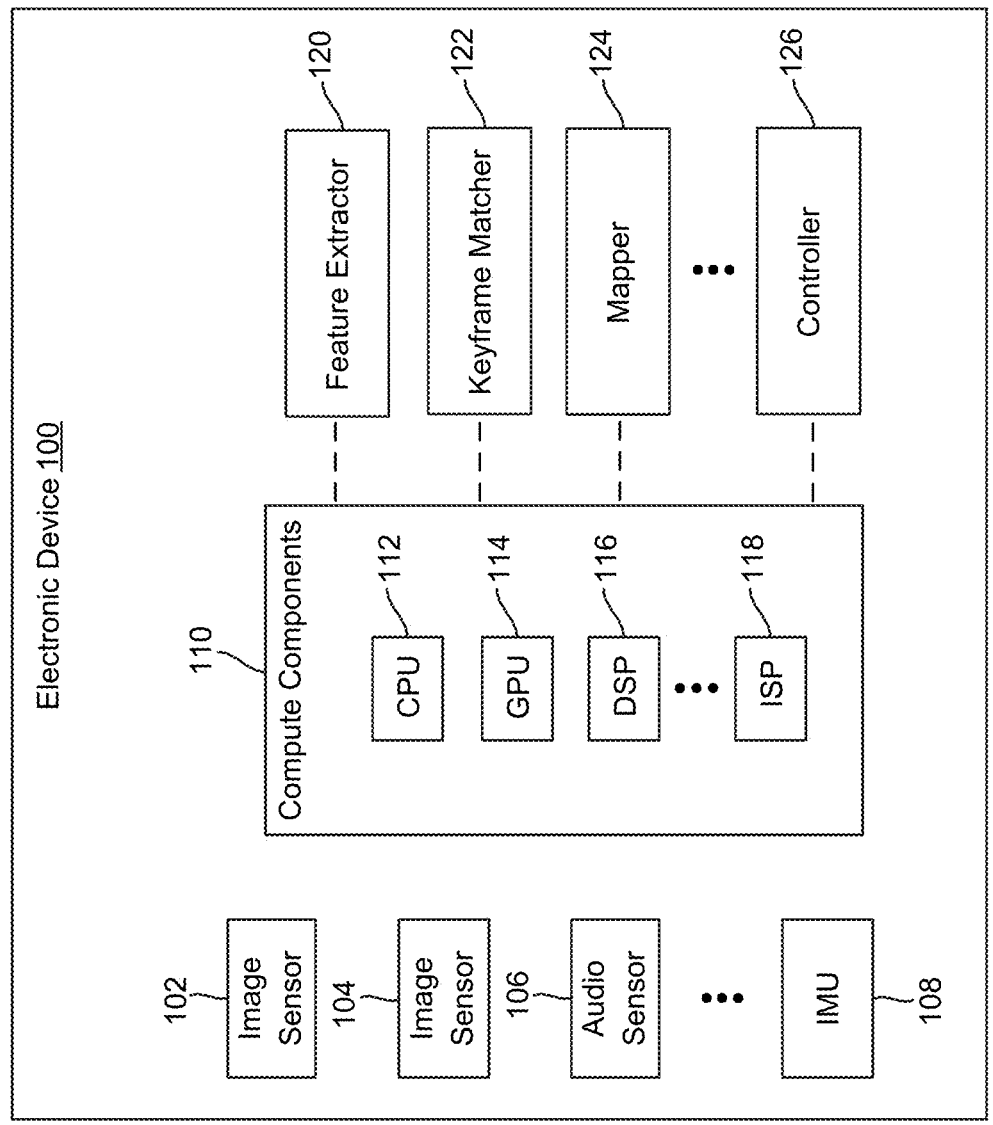
FIG. 1 is a diagram illustrating an example of an electronic device used to determine event data and control one or more components and/or operations of the electronic device based on the event data, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices (e.g., mobile phones, wearable devices (e.g., smart watches, smart bracelets, smart glasses, etc.), tablet computers, extended reality (XR) devices (e.g., virtual reality (VR) devices, augmented reality (AR) devices, mixed reality (MR) devices, and the like), connected devices, laptop computers, etc.) can implement cameras to detect and/or recognize events of interest. For example, electronic devices can implement cameras that can operate at a reduced power mode and/or can operate as lower-power cameras (e.g., lower than a capacity of the cameras and/or any other cameras on the electronic device) to detect and/or recognize events of interest on demand, an on-going, or a periodic basis. In some examples, a lower-power camera can include a camera operating in a reduced or lower power mode/consumption (e.g., relative to the power mode/consumption capabilities of the camera and/or another camera with higher power mode/consumption capabilities). In some cases, a lower-power camera can employ lower-power settings (e.g., lower power modes, lower power operations, lower power hardware, lower power camera pipeline, etc.) to allow for persistent imaging with limited or reduced power consumption as compared to other cameras and/or camera pipelines, such as a main camera and/or main camera pipeline. The lower-power settings employed by the lower-power camera can include, for example and without limitation, a lower resolution, a lower amount of image sensors (and/or an image sensor(s) having a lower power consumption than other image sensors on the electronic device), a lower framerate, on-chip static random-access memory (SRAM) rather than dynamic random-access memory (DRAM) which may generally draw more power than SRAM, island voltage rails, oscillators (e.g., rather than phase lock loops (PLLs) which may have a higher power draw) for lock sourcing, and/or other hardware/software components/settings that result in lower power consumption.

As noted above, the cameras can be used to detect events of interest. Example events of interest can include gestures (e.g., hand gestures, etc.), an action (e.g., by a device, person, and/or animal), a presence or occurrence of one or more objects, etc. An object associated with an event of interest can include and/or refer to, for example and without limitation, a face, a hand, one or more fingers, a portion of a human body, a code (e.g., a quick response (QR) code, a barcode, etc.), a document, a scene or environment, a link, a machine-readable code, etc. The lower-power cameras can implement lower-power hardware and/or energy efficient image processing software used to detect events of interest. The lower-power cameras can remain on or "wake up" to watch movement and/or objects in a scene and detect events in the scene while using less battery power than other devices such as higher power/resolution cameras.

For example, a camera can watch movement and/or activity in a scene to discover objects. In some examples, the camera can employ lower-power settings for lower or limited power consumption as previously described and as compared to the camera or another camera employing higher-power settings. To illustrate, an XR device can implement a camera that periodically discovers an XR controller and/or other tracked objects, a mobile phone can implement a camera that periodically checks for a code (e.g., QR code) or document to scan, a smart home assistant can implement a camera that periodically checks for a user presence, etc. Upon discovering an object, the camera can trigger one or more actions such as, for example, object detection, object recognition, authentication (e.g., facial authentication, etc.), and/or image processing tasks, among other actions. In some cases, the cameras can "wake up" other devices and/or components such as other cameras, sensors, processing hardware, etc.

While the power consumption of a camera employing lower-power settings can be relatively low as compared to the camera or another camera employing higher-power settings relative to the lower-power settings (e.g., higher resolution relative to the lower-power settings, a higher amount of image sensors relative to the lower-power settings (and/or an image sensor(s) having a higher power consumption than other image sensors on the device), a higher framerate relative to the lower-power settings, DRAM as opposed to on-chip SRAM, PLLs as opposed to ring oscillators, etc.), the power consumption can increase as the occurrence of events of interest increases. Moreover, in some use cases, there may be latency goals and/or requirements that dictate higher framerates, resolutions, number of camera sensors used, etc., which can further increase the power consumption of the camera. For example, in some cases, when detecting a QR code, a camera may use a higher framerate to register the QR code faster and reduce a registration latency. Thus, over time, the cameras can consume an increasing amount of power which can impact the overall power consumption at the device. In some cases, the lower-power cameras can consume an increasingly unnecessary amount of power as the number of false-positive detection events increases.

A camera may be more likely to encounter certain events of interest in certain locations/environments. For example, a user of an XR device may typically play augmented reality games in a certain room of the house. The XR device may implement a camera that discovers a controller used in conjunction with the XR device to play the virtual reality games. Thus, the camera of the XR device may consume more power when the XR device is in that room as the camera encounters frequent detection events in that environment. As another example, a user may typically scan QR codes on restaurant menus when ordering delivery from the kitchen. Therefore, a camera implemented by the user's mobile device to discover the QR code may experience higher power consumption when the mobile device is in the kitchen (e.g., as opposed to when the mobile device is in one or more other environments) as the camera encounters more frequent detection events in that environment.

As illustrated above, different environments can trigger higher or lower power consumption from a camera than other environments, and certain use cases, which can have a higher or lower frequency in certain environments, can have higher or lower latency requirements. This can lead to unnecessary and/or excessive power consumption in some cases and environments, as well as excessive or inadequate performance/device settings (e.g., framerates, resolution, number and frequency of use of sensors, etc.) in some cases and environments.

Systems, apparatuses, methods (also referred to as processes), and computer-readable media (collectively referred to herein as "systems and techniques") are described herein for camera setting adjustments based on event data. In some examples, a camera can implement a process to detect events in an environment and associate detected events with the environment and/or a location associated with the environment. The process can use associations of environments/locations and detected events to determine the likelihood of events of interest in certain environments/locations. The process can use the likelihood information to adjust the settings of the camera to reduce unnecessary power consumption and/or adjust performance settings according to more likely/expected latency requirements. For example, the camera can increase one or more settings (e.g., framerate, resolution, number of image sensors invoked, power mode, etc.) to decrease a latency of the camera when the camera is in an environment where a detection event of interest (e.g., a detection of an event of interest) has a higher likelihood to occur. As another example, the camera can decrease one or more settings (e.g., framerate, resolution, number of image sensors invoked, power mode, etc.) to decrease a power consumption of the camera when the camera is in an environment where a detection event of interest has a lower likelihood to occur.

In some aspects, an electronic device (e.g., an XR device, a mobile device, a connected device, a tablet computer, a laptop computer, a smart wearable device, etc.) with a camera can conserve power and increase a camera performance by modulating the camera settings (e.g., framerate, resolution, number of image sensors invoked, power mode, etc.) based on event data (e.g., an event map associating one or more environments (and/or associated regions/portions) to previously-detected events of interest, a classification map, classification data, one or more keyframes, features extracted from frames, event statistics, historical data, etc.) that identifies occurrences of events of interest in one or more environments. In some examples, to generate the event data (e.g., event map, extracted features, one or more keyframes, classification data, event statistics, etc.) used to modulate camera settings, the electronic device can implement a feature extractor that opportunistically extracts visual features from incoming frames obtained by the camera. The feature extractor can implement a detector and/or algorithm such as, for example, a scale-invariant feature transform (SIFT), a speeded up robust features (SURF), Oriented FAST and rotated BRIEF (ORB), and/or any other detector/algorithm. To generate the event data (e.g., event map, extracted features, classification data, etc.) used to modulate camera settings, the electronic device can also implement a keyframe matcher that compares features of the incoming camera frames to features of keyframes in the event data.

In some examples, the keyframes in the event data can include keyframes created based on camera frames associated with a detected event of interest. The electronic device can implement a mapper that determines whether to create a new keyframe (or replace an existing keyframe) associated with an event, and record (or update) an event count associated with that keyframe in the event data. The event data can include a number of keyframes corresponding to locations/environments where camera events have been observed, along with event counts associated with those keyframes. A controller can use the map to modulate one or more settings (e.g., framerate, resolution, power mode, binning mode, imaging mode, number of image sensors invoked, etc.) of the camera based on a match between an incoming camera frame and a keyframe in the map.

In some cases, the event data can include a dictionary or data structure with entries containing visual features of keyframes and the number of occurrences of camera events of interest that coincide with each of the keyframes (and/or the number of matches to the keyframe). For example, the event data can include a dictionary with an entry indicating n number of face detection events (e.g., n number of previous detections of a face) are associated with one or more visual features corresponding to keyframe x. By summing the count of events of interest across keyframes related to a certain environment and/or region/portion of the environment associated with the events of interest, a total count (e.g., for recorded keyframes) for each event can be computed. The total count for an event can be used to determine a prior probability of that event for a given keyframe associated with that event. For example, the total count of detection events (e.g., previous detections of events of interest) for keyframes x and y (or the number of matches to keyframes x and y) can be used to determine that a certain percent of detection events are associated with keyframe x and a certain percent of detection events are associated with keyframe y. The probabilities can be used to adjust settings of the camera when the camera is in an environment associated with a keyframe in the mapper (e.g., based on a match between a camera frame captured in that environment and a keyframe in the mapper that is associated with that environment).

The mapper can determine whether to create a new entry in the map based on one or more factors. For example, in some cases, the mapper can determine whether to create a new entry in the map depending on whether a current frame matches an existing keyframe in the map, whether a camera event of interest was detected in the current frame, a time elapsed since a last keyframe was created, a time elapsed since a last keyframe match, etc. In some cases, the mapper can employ a periodic culling process to eliminate map entries with low likelihoods of events (e.g., map entries having a likelihood of events at or below a threshold). In some examples, the periodic culling process can be adaptive based on one or more factors such as, resource availability (e.g., available memory, etc.). For example, if the amount of memory available on the device is above a threshold, the mapper may not perform (or may skip or delay) the culling process even if there are one or more map entries with a low likelihood of an event of interest (e.g., a likelihood at or below a threshold). As another example, if the amount of memory available on the device is below the threshold, the mapper may perform the culling process and remove one or more map entries even if such entries have an event likelihood that is above a certain threshold that would otherwise cause the mapper to maintain such entries when the amount of available memory is not below the threshold.

The controller can modulate one or more settings of the camera (e.g., framerate, resolution, power mode, number of image sensors invoked, binning mode, imaging mode, etc.) based on the camera event prior probabilities for a currently (or recently within a threshold period) matched keyframe. In some examples, the controller can incorporate a configurable framerate for each camera event of interest. In some examples, whenever the mapper indicates a matched keyframe, the controller can set the framerate of the camera to a framerate equal to the configurable framerate times the prior probability for the matched keyframe entry in the map. In some examples, the camera can maintain this framerate for a configurable period of time or until the next matched keyframe. In some cases, when/if there are no current (or recently within a threshold period) matched keyframes, the camera can implement a default framerate, such as a lower framerate which can result in lower power consumption during periods of unlikely detection events.

The electronic device (and/or the camera on the electronic device) can monitor (and implement the systems and techniques described herein for) various types of events. Non-limiting examples of detection events can include face detection, scene detection (e.g., sunset, document scanning, etc.), human group detection, animal/pet detection, code (e.g., QR code, barcode, etc.) detection, infrared LED detection (e.g., as with a six degrees of freedom (6DOF) motion tracker), two-dimensional plane detection, text detection, device detection (e.g., controller, screen, gadget, computing device, etc.), gesture detection (e.g., smile detection, emotion detection, hand waving, finger pointing, etc.), etc.

In some cases, the mapper can employ a periodic decay normalization process by which event counts are proportionally decreased by a configurable amount across map entries. This can keep the count values numerically bound and allow for more rapid adjustment of priors when event/keyframe correlations change.

In some cases, the camera can implement a decaying default setting, such as a framerate. For example, a reduced framerate can be associated with an increased event detection latency (e.g., a higher framerate can result in a lower latency). For a default framerate (e.g., a framerate when no keyframes have been matched), the controller may default the framerate of the camera to a lower framerate (e.g., which can result in a higher detection latency) when the map contains a smaller number (e.g., below a threshold) of recorded events. For such cases, the controller can implement a default framerate that begins high but decays as more events are added to the map (e.g., as the device learns which locations/environments are most associated with events of interest).

In some cases, the electronic device can use non-camera events for the mapper decision-making. For example, the electronic device can use non-camera events such as creation of new keyframes, culling/elimination of stale keyframes, etc. In some cases, the controller can modulate non-camera workloads/resources based on camera keyframes and/or non-camera events. For example, the controller can implement audio algorithms (e.g., beamforming, etc.) modulated by camera keyframes and/or audio-based presence detection. As another example, the controller can implement location services (e.g., Global Navigation Satellite System (GNSS), Wi-Fi, etc.), application data (e.g., data from one or more applications on the electronic device such as an XR application), one or more user inputs, and/or other data, modulated by camera keyframes and/or use of location services.

Various aspects of the application will be described with respect to the figures.

FIG. 1 is a diagram illustrating an example of an electronic device 100 used to map events and control one or more components and/or operations of the electronic device 100 based on mapped events, in accordance with some examples of the present disclosure. In some examples, the electronic device 100 can include an electronic device configured to provide one or more functionalities such as, for example, imaging functionalities, extended reality (XR) functionalities (e.g., localization/tracking, detection, classification, mapping, content rendering, etc.), image processing functionalities, device management and/or control functionalities, gaming functionalities, autonomous driving or navigation functionalities, computer vision functionalities, robotic functions, automation, computer vision, etc.

For example, in some cases, the electronic device 100 can be an XR device (e.g., a head-mounted display, a heads-up display device, smart glasses, etc.) configured to detect, localize, and map the location of the XR device, provide XR functionalities, and map events as described herein to control one or more operations/states of the XR device. In some cases, the electronic device 100 can implement one or more applications such as, for example and without limitation, an XR application, an application for managing and/or controlling components and/or operations of the electronic device 100, a smart home application, a video game application, a device control application, an autonomous driving application, a navigation application, a productivity application, a social media application, a communications application, a modeling application, a media application, an electronic commerce application, a browser application, a design application, a map application, and/or any other application.

In the illustrative example shown in FIG. 1, the electronic device 100 can include one or more image sensors, such as image sensors 102 and 104, an audio sensor 106 (e.g., an ultrasonic sensor, a microphone, etc.), an inertial measurement unit (IMU) 108, and one or more compute components 110. In some cases, the electronic device 100 can optionally include one or more other/additional sensors such as, for example and without limitation, a radar, a light detection and ranging (LIDAR) sensor, a touch sensor, a pressure sensor (e.g., a barometric air pressure sensor and/or any other pressure sensor), a gyroscope, an accelerometer, a magnetometer, and/or any other sensor. In some examples, the electronic device 100 can include additional components such as, for example, a light-emitting diode (LED) device, a storage device, a cache, a communications interface, a display, a memory device, etc. An example architecture and example hardware components that can be implemented by the electronic device 100 are further described below with respect to FIG. 7.

The electronic device 100 can be part of, or implemented by, a single computing device or multiple computing devices. In some examples, the electronic device 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a gaming console, an XR device such as an HMD, a drone, a computer in a vehicle, an IoT (Internet-of-Things) device, a smart wearable device, or any other suitable electronic device(s).

In some implementations, the image sensor 102, the image sensor 104, the audio sensor 106, the IMU 108, and/or the one or more compute components 110 can be part of the same computing device. For example, in some cases, the image sensor 102, the image sensor 104, the audio sensor 106, the IMU 108, and/or the one or more compute components 110 can be integrated with or into a camera system, a smartphone, a laptop, a tablet computer, a smart wearable device, an XR device such as an HMD, an IoT device, a gaming system, and/or any other computing device. In other implementations, the image sensor 102, the image sensor 104, the audio sensor 106, the IMU 108, and/or the one or more compute components 110 can be part of, or implemented by, two or more separate computing devices.

The one or more compute components 110 of the electronic device 100 can include, for example and without limitation, a central processing unit (CPU) 112, a graphics processing unit (GPU) 114, a digital signal processor (DSP) 116, and/or an image signal processor (ISP) 118. In some examples, the electronic device 100 can include other processors such as, for example, a computer vision (CV) processor, a neural network processor (NNP), an application-specific integrated circuit (ASIC), a field-programmable gate array (FPGA), etc. The electronic device 100 can use the one or more compute components 110 to perform various computing operations such as, for example, extended reality operations (e.g., tracking, localization, object detection, classification, pose estimation, mapping, content anchoring, content rendering, etc.), device control operations, image/video processing, graphics rendering, event mapping, machine learning, data processing, modeling, calculations, computer vision, and/or any other operations.

In some cases, the one or more compute components 110 can include other electronic circuits or hardware, computer software, firmware, or any combination thereof, to perform any of the various operations described herein. In some examples, the one or more compute components 110 can include more or less compute components than those shown in FIG. 1. Moreover, the CPU 112, the GPU 114, the DSP 116, and the ISP 118 are merely illustrative examples of compute components provided for explanation purposes.

The image sensor 102 and/or the image sensor 104 can include any image and/or video sensor or capturing device, such as a digital camera sensor, a video camera sensor, a smartphone camera sensor, an image/video capture device on an electronic apparatus such as a television or computer, a camera, etc. In some cases, the image sensor 102 and/or the image sensor 104 can be part of a camera or computing device such as a digital camera, a video camera, an IP camera, a smartphone, a smart television, a game system, etc. Moreover, in some cases, the image sensor 102 and the image sensor 104 can include multiple image sensors, such as rear and front sensor devices, and can be part of a dual-camera or other multi-camera assembly (e.g., including two camera, three cameras, four cameras, or other number of cameras).

In some examples, the image sensor 102 can be part of a camera, such as a camera that implements or is capable of implementing lower-power camera settings as previously described, and the image sensor 104 can be part of a camera, such as a camera that implements or is capable of implementing higher-power camera settings (e.g., as compared to the camera associated with the image sensor 102). In some examples, a camera associated with the image sensor 102 can implement lower-power hardware (e.g., as compared to a camera associated with the image sensor 104) and/or more energy efficient image processing software (e.g., as compared to a camera associated with the image sensor 104) used to detect events and/or process captured image data. In some cases, the camera can implement lower power settings and/or modes than the camera associated with the image sensor 104 such as, for example, a lower framerate, a lower resolution, a smaller number of image sensors, a lower-power mode, lower-power imaging mode, etc. In some examples, the camera can implement less and/or lower-power image sensors than a higher-power camera, can use lower-power memory such as on-chip static random-access memory (SRAM) rather than dynamic random-access memory (DRAM), can use island voltage rails to reduce leakage, can use ring oscillators as clock sources rather than phased-locked loops (PLLs), and/or other lower-power processing hardware/components.

In some cases, the cameras associated with image sensor 102 and/or image sensor 104 can remain on or "wake up" to watch movement and/or events in a scene and/or detect events in the scene while using less battery power than other devices such as higher power/resolution cameras. For example, a camera associated with image sensor 102 can persistently watch or wake up (for example, by a proximity sensor or wake up periodically) to watch movement and/or activity in a scene to discover objects in the scene. In some cases, upon discovering an event, the camera can trigger one or more actions such as, for example, object detection, object recognition, facial authentication, image processing tasks, among other actions. In some cases, the cameras associated with image sensor 102 and/or image sensor 104 can also "wake up" other devices such as other sensors, processing hardware, etc.

In some examples, each image sensor 102 and 104 can capture image data and generate frames based on the image data and/or provide the image data or frames to the one or more compute components 110 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some examples, the one or more compute components 110 can perform image/video processing, event mapping, XR processing, device management/control, and/or other operations as described herein using data from the image sensor 102, the image sensor 104, the audio sensor 106, the IMU 108, and/or any other sensors and/or component. For example, in some cases, the one or more compute components 110 can perform event mapping, device control/management, tracking, localization, object detection, object classification, pose estimation, shape estimation, scene mapping, content anchoring, content rendering, image processing, modeling, content generation, gesture detection, gesture recognition, and/or other operations based on data from the image sensor 102, the image sensor 104, the audio sensor 106, the IMU 108, and/or any other component. In some examples, the one or more compute components 110 can use data from the image sensor 102, the image sensor 104, the audio sensor 106, the IMU 108, and/or any other component, to generate event data (e.g., an event map correlating detected events to particular environments and/or regions/portions of the environments) and adjust a state (e.g., power mode, setting, etc.) and/or operation of one or more components such as, for example, the image sensor 102, the image sensor 104, the audio sensor 106, the IMU 108, the one or more compute components 110, and/or any other components of the electronic device 100. In some examples, the one or more compute components 110 can detect and map events in a scene and/or control an operation/state of the electronic device 100 (and/or one or more components thereof), based on data from the image sensor 102, the image sensor 104, the audio sensor 106, the IMU 108, and/or any other component.

In some examples, the one or more compute components 110 can implement one or more software engines and/or algorithms such as, for example, a feature extractor 120, a keyframe matcher 122, a mapper 124, and a controller 126, as described herein. In some cases, the one or more compute components 110 can implement one or more additional components and/or algorithms such as a machine learning model(s), a computer vision algorithm(s), a neural network(s), and/or any other algorithm and/or component.

In some examples, the feature extractor 120 can extract visual features from one or more frames obtained by a camera device, such as a camera device associated with image sensor 102. The feature extractor 120 can implement a detector and/or algorithm to extract the visual features such as, for example and without limitation, a scale-invariant feature transform (SIFT), speeded up robust features (SURF), Oriented FAST and rotated BRIEF (ORB), and/or any other detector/algorithm.

In some examples, the keyframe matcher 122 can compare features of the one or more frames obtained by the camera device (e.g., the visual features extracted by the feature extractor 120) to features of keyframes in event data (e.g., an event map) generated by the mapper 124. In some cases, the event data can include an event map that correlates detected events of interest (and/or associated data such as keyframes, extracted image features, event counts, etc.) with one or more specific environments (and/or portions/regions of the specific environments) in which such detected events occurred (and/or were detected). In some examples, the keyframes in the event data can include keyframes created based on frames associated with detected events of interest. The mapper 124 can determine whether to create a new keyframe (or replace an existing keyframe) associated with an event, and record (or update) an event count associated with that keyframe in the event data. The event data can include a number of keyframes corresponding to one or more locations/environments where events of interest have been observed (e.g., detected from one or more frames obtained by the camera device) and event counts associated with those keyframes. The controller 126 can use the event data to modulate one or more settings (e.g., framerate, resolution, power mode, number of image sensors invoked, binning mode, imaging mode, etc.) of the camera device (e.g., one or more settings of the image sensor 102 and/or one or more other hardware and/or software components) based on a match between an incoming frame from the camera device and a keyframe in the event data.

In some cases, the event data can include an event map, classification data, keyframe data, features extracted from frames, classification map data, event statistics, and/or a dictionary with entries containing visual features of keyframes and the number of occurrences of detected events of interest that coincide with each of the keyframes (and/or the number of matches to the keyframe). For example, the event data can include a dictionary with an entry indicating n number of face detection events are associated with one or more visual features corresponding to keyframe x. In some examples, the mapper 124 can compute a count (e.g., for recorded keyframes) for each event. In some cases, the count can include a count and/or an average of occurrences of the event of interest within a certain period of time. In some cases, the count can include a total count of occurrences of the event of interest. In some examples, the mapper 124 can determine a total count based on a sum of the count of events of interest across keyframes that are associated with an environment(s) corresponding to the events and/or a region/portion of the environment(s). The count for an event can be used to determine a prior probability of that event for a given keyframe associated with that event. For example, the count of detection events for keyframes x and y (or the number of matches to keyframes x and y) can be used to determine that a first measure of detection events are associated with keyframe x and a second measure of detection events are associated with keyframe y.

The controller 126 can use the probabilities to adjust one or more settings of the camera device (e.g., the camera device associated with image sensor 102) when the camera device is in an environment associated with a keyframe in the event data (e.g., based on a match between a frame captured in that environment and a keyframe in the event data and associated with that environment). In some cases, the controller 126 can alternatively or additionally use the probabilities to adjust one or more settings of other components of the electronic device 100, such as another camera device (e.g., a camera device associated with image sensor 104, a camera device employing and/or having capabilities to employ higher-power camera settings than the camera device associated with image sensor 102, etc.), a processing component and/or pipeline, etc., when the electronic device 100 is or is not in an environment associated with a keyframe in the event data.

The mapper 124 can determine whether to create a new entry in the event data based on one or more factors. For example, in some cases, the mapper 124 can determine whether to create a new entry in the event data depending on whether a current frame captured by the camera device (e.g., the camera device associated with image sensor 102) matches an existing keyframe in the event data, whether a camera event of interest was detected in the current frame, a time elapsed since a last keyframe was created, a time elapsed since a last keyframe match, etc. In some cases, the mapper 124 can employ a periodic culling process to eliminate map entries with lower likelihoods of events (e.g., with likelihoods having a probability value at or below a threshold).

In some examples, the controller 126 can modulate one or more settings of the camera device (e.g., the camera device associated with image sensor 102) such as, for example and without limitation, increasing or decreasing a framerate, a resolution, a power mode, an imaging mode, a number of image sensors invoked to capture one or more images associated with an event of interest, processing actions and/or a processing pipeline for processing captured images and/or detecting events in captured images, etc. For example, in some cases, the electronic device 100 may be statistically more likely to encounter certain events of interest in certain environments. In some cases, to avoid wasting unnecessary power when the electronic device 100 is located in an environment where the electronic device 100 has a lower likelihood of encountering an event of interest, the controller 126 can turn off the camera device or modulate one or more settings of the camera device to reduce power usage by the camera device when the electronic device 100 is in the environment associated with the lower likelihood of encountering an event of interest. When the electronic device 100 is located in an environment where the electronic device 100 has a higher likelihood of encountering an event of interest, the controller 126 can turn on the camera device or modulate one or more settings of the camera device to increase power usage by, and/or performance of, the camera device when the electronic device 100 is in the environment associated with the higher likelihood of encountering an event of interest.

In some cases, the controller 126 can modulate one or more settings of a camera device(s) (e.g., image sensor 102, image sensor 104) based on the camera event prior probabilities for a currently (or recently within a threshold period) matched keyframe. In some examples, the controller 126 can incorporate a configurable framerate for each camera event of interest. In some examples, when the mapper 124 indicates a matched keyframe, the controller 126 can set the framerate of the camera device to a framerate equal to the configurable framerate times the prior probability for the matched keyframe entry in the event data. In some examples, the camera device can maintain this framerate for a configurable period of time or until the next matched keyframe. In some cases, when/if there are no current (or recently within a threshold period) matched keyframes, the camera device can implement a default framerate, such as a lower framerate that results in lower power consumption during periods of unlikely detection events.

In some examples, the electronic device 100 (and/or the controller 126 on the electronic device 100) can monitor (and implement the techniques described herein for) various types of events. Non-limiting examples of detection events can include face detection, scene detection (e.g., sunset, room, etc.), human group detection, animal/pet detection, code (e.g., QR code, etc.) detection, document detection, infrared LED detection (e.g., as with a six degrees of freedom (6DOF) motion tracker), plane detection, text detection, device detection (e.g., controller, screen, gadget, etc.), gesture detection (e.g., smile detection, emotion detection, hand waving, etc.), among others.

In some cases, the mapper 124 can employ a periodic decay normalization process by which event counts are decreased by a configurable amount across map entries. This can keep the count values numerically bound and allow for more rapid adjustment of priors when event/keyframe correlations change.

In some cases, the camera device (e.g., image sensor 102) can implement a decaying default setting, such as a framerate. For example, a reduced framerate can be associated with an increased event detection latency (e.g., a higher framerate can result in a lower latency). For a default framerate (e.g., a framerate when no keyframes have been matched), the controller 126 may default the framerate of the camera device to a lower framerate (e.g., which can result in a higher detection latency) when the event data contains a smaller number (e.g., below a threshold) of recorded events. For such cases, the controller 126 can implement a default framerate that begins at a threshold level but decays as more events are added to the event data (e.g., as the electronic device learns which locations/environments are most associated with events of interest).

In some cases, the mapper 124 can use non-camera events for the mapper decision-making. For example, the mapper 124 can use non-camera events such as a creation of new keyframes, culling/elimination of stale keyframes, etc. In some cases, the controller 126 can modulate non-camera workloads/resources based on keyframes and/or non-camera events. For example, the controller 126 can implement one or more audio algorithms (e.g., beamforming, etc.) modulated by camera device keyframes and/or audio-based presence detection. As another example, the controller 126 can implement location services (e.g., Global Navigation Satellite System (GNSS), Wi-Fi, etc.), application data, user inputs, and/or other data, modulated by camera device keyframes and/or use of location services.

In some cases, the IMU 108 can detect an acceleration, angular rate, and/or orientation of the electronic device 100 and generate measurements based on the detected acceleration. In some cases, the IMU 108 can detect and measure the orientation, linear velocity, and/or angular rate of the electronic device 100. For example, the IMU 108 can measure a movement and/or a pitch, roll, and yaw of the electronic device 100. In some examples, the electronic device 100 can use measurements obtained by the IMU 108 and/or data from one or more of the image sensor 102, the image sensor 104, the audio sensor 106, etc., to calculate a pose of the electronic device 100 within 3D space. In some cases, the electronic device 100 can additionally or alternatively use sensor data from the image sensor 102, the image sensor 104, the audio sensor 106, and/or any other sensor to perform tracking, pose estimation, mapping, generating event data entries, and/or other operations as described herein.

The components shown in FIG. 1 with respect to the electronic device 100 are illustrative examples provided for explanation purposes. In other examples, the electronic device 100 can include more or less components than those shown in FIG. 1. While the electronic device 100 is shown to include certain components, one of ordinary skill will appreciate that the electronic device 100 can include more or fewer components than those shown in FIG. 1. For example, the electronic device 100 can include, in some instances, one or more memory devices (e.g., RAM, ROM, cache, and/or the like), one or more networking interfaces (e.g., wired and/or wireless communications interfaces and the like), one or more display devices, caches, storage devices, and/or other hardware or processing devices that are not shown in FIG. 1. An illustrative example of a computing device and/or hardware components that can be implemented with the electronic device 100 are described below with respect to FIG. 7.

Figure 2A:
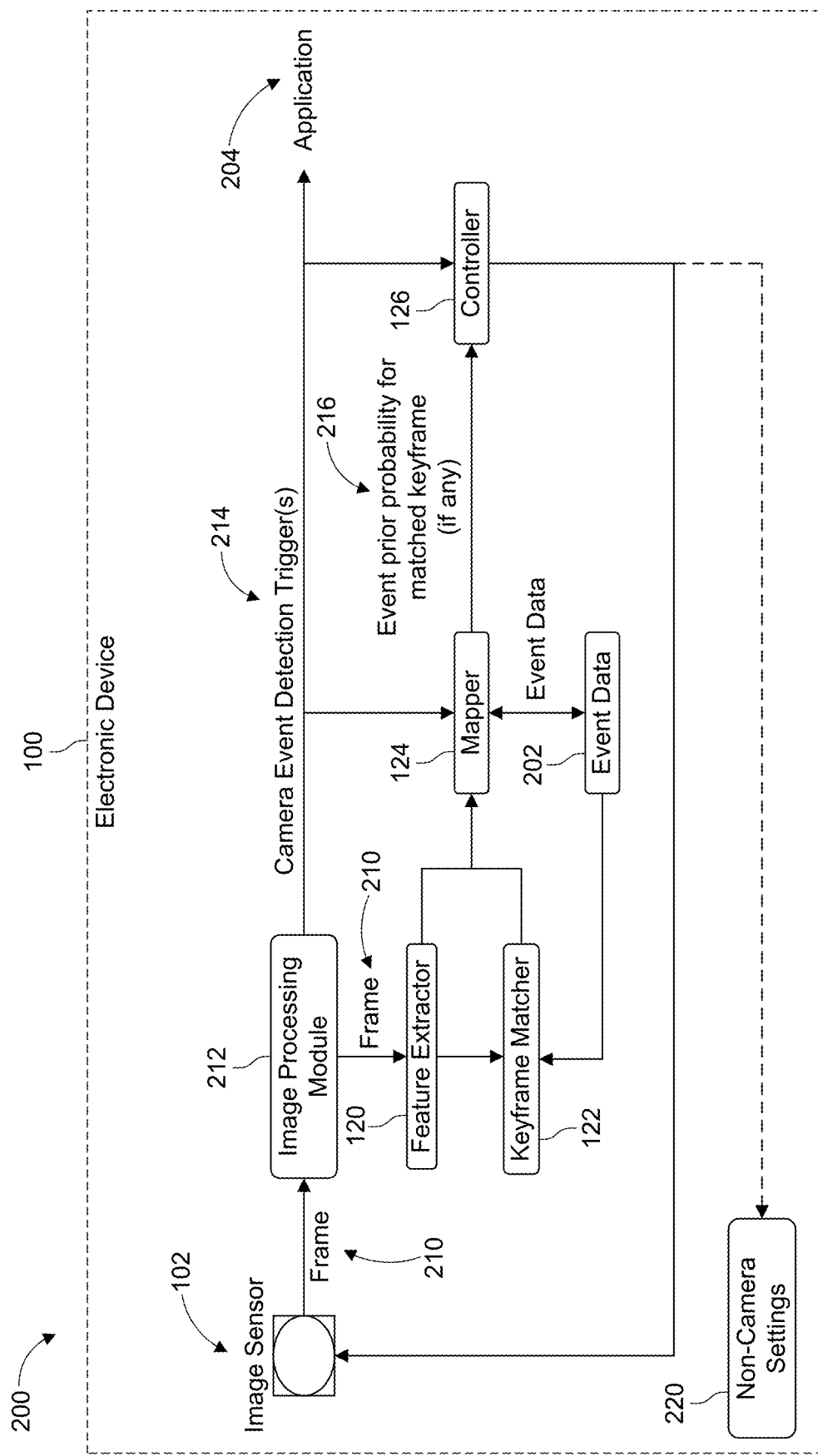
FIG. 2A and FIG. 2B are diagrams illustrating example system processes for mapping events associated with an environment and controlling settings of a device based on mapped events, in accordance with some examples of the present disclosure.

FIG. 2A is a diagram illustrating an example system process 200 for mapping events associated with an environment and controlling settings (e.g., power states, operations, parameters, etc.) of a camera device based on mapped events. In this example, the image sensor 102 can capture a frame 210 of a scene and/or an event in an environment where the image sensor 102 is located. In some examples, the image sensor 102 can monitor an environment and/or look for events of interest in the environment to capture a frame of any event of interest in the environment. An event of interest can include, for example and without limitation, a gesture (e.g., a hand gesture, etc.), an emotion (e.g., a smile, etc.), an activity or action (e.g., by a person, a device, an animal, etc.), an occurrence or present of an object, etc. An object associated with an event of interest can include, represent, and/or refer to, for example and without limitation, a face, a scene (e.g., a sunset, a park, a room, etc.), a person, a group of people, an animal, a document, a code (e.g., a QR code, a barcode, etc.) on an object (e.g., a device, a document, a display, a structure such as a door or wall, a sign, etc.), a light, a pattern, a link on an object, a plane in a physical space (e.g., a plane on a surface, etc.), text, infrared (IR) light-emitting diode (LED) detection, and/or any other object.

The electronic device 100 can use an image processing module 212 to perform one or more image processing operations on the frame 210. In some examples, the one or more image processing operations can include object detection to detect one or more camera event detection triggers 214 based on the frame 210. For example, the image processing module 212 can extract features from the frame and use the extracted features for object detection. The image processing module 212 can detect the one or more camera event detection triggers 214 based on the extracted features. The one or more camera event detection triggers 214 can include one or more events of interest as previously described. In some examples, the one or more image processing operations can include a camera processing pipeline associated with the image sensor 102. In some cases, the one or more image processing operations can detect and/or recognize one or more camera event detection triggers 214. The image processing module 212 can provide the one or more camera event detection triggers 214 to the feature extractor 120, the mapper 124, the controller 126, and/or an application 204 on the electronic device 100. The feature extractor 120, the mapper 124, the controller 126, and/or the application 204 can use the one or more camera event detection triggers 214 to perform one or more actions as described herein, such as application operations, camera setting adjustments, object detection, object recognition, etc. For example, the one or more camera event detection triggers 214 can be configured to trigger one or more actions by the feature extractor 120, the mapper 124, the controller 126, and/or the application 204, as explained herein.

In some examples, the application 204 can include any application on the electronic device 100 that can use information about events detected in an environment. For example, the application 204 can include an authentication application (e.g., facial authentication application, etc.), an XR application, a navigation application, an application for ordering or purchasing items, a video game application, a photography application, a device management application, a web application, a communications application (e.g., a messaging application, a video and/or voice application, etc.), a media playback application, a social media network application, a browser application, a scanning application, etc. The application 204 can use the one or more camera event detection triggers 214 to perform one or more actions. For example, if the application 204 is an XR application, the application 204 can use the one or more camera event detection triggers 214 to discover an event in the environment for use by the application 204, such as for example, a device (e.g., a controller or other input device, etc.), a hand, a boundary, a person, etc. As another example, the application 204 can use the one or more camera event detection triggers 214 to scan a document, link, or code and perform an action based on the document, link, or code. As yet another example, if the application 204 is a smart home assistant application, the application 204 can use the one or more camera event detection triggers 214 to discover a presence of a person and/or object to trigger a smart home device operation/action.

Moreover, the feature extractor 120 can analyze the frame 210 to extract visual features in the frame 210. In some examples, the feature extractor 120 can perform object recognition to extract visual features in the frame 210 and classify an event associated with the extracted features. In some cases, the feature extractor 120 can implement an algorithm to extract visual features from the frame 210 and determine a descriptor(s) of the extracted features. Non-limiting examples of a feature extractor/detector algorithm can include SIFT, SURF, ORB, and the like.

The feature extractor 120 can provide features extracted from the frame 210 and an associated descriptor(s) to the keyframe matcher 122 and the mapper 124. The associated descriptor(s) can identify and/or describe the features extracted from the frame 210 and/or an event detected from the extracted features. In some examples, the associated descriptor(s) can include a tag, label, identifier, and/or any other descriptor.

The keyframe matcher 122 can use the features and/or descriptor(s) from the feature extractor 120 to determine whether the electronic device 100 is located (or determine a likelihood that the electronic device 100 is located) in an environment (or a region/location within an environment) where events of interest have been previously detected. In some examples, the keyframe matcher 122 can use event data 202 containing keyframes to determine whether the electronic device 100 is located (or determine a likelihood that the electronic device 100 is located) in an environment (or a region/location within an environment) where events of interest have been previously detected. In some examples, the event data 202 can include keyframes corresponding to frames capturing detected events of interest. In some cases, the event data 202 can include a number of keyframes corresponding to locations/environments where events of interest have been observed (e.g., detected from one or more frames obtained by the image sensor 102 or the image sensor 104) and event counts associated with those keyframes.

In some cases, the event data 202 can include an event map, event entries, classification data, one or more keyframes, a classification map, event statistics, extracted features, feature descriptors, and/or any other data. In some examples, the event data 202 can include a dictionary with entries containing visual features of keyframes and the number of occurrences of detected events of interest (e.g., event counts) that coincide with each of the keyframes (and/or the number of matches to the keyframe). For example, the event data 202 can include a dictionary with an entry indicating n number of QR code detection events (e.g., n number of previous detections of a QR code) are associated with one or more visual features corresponding to keyframe x. In some cases, the keyframe matcher 122 can employ a periodic decay normalization process by which event counts are decreased by a configurable amount across one or more event data entries. For example, the keyframe matcher 122 can employ a periodic decay normalization process by which event counts are decreased by a configurable amount across all event data entries. This can keep the count values numerically bound and allow for more rapid adjustment of priors when event/keyframe correlations change.

In some examples, the keyframe matcher 122 can compare the features extracted from the frame 210 with features of keyframes in the event data 202. In some examples, the keyframe matcher 122 can compare a descriptor(s) of the features extracted from the frame 210 with descriptors of features of keyframes in the event data 202. Since the keyframes in the event data 202 correspond to an environment or a location in an environment where an event of interest has previously been detected, a match between the features extracted from the frame 210 (and/or an associated descriptor) and features of a keyframe in the event data 202 (and/or an associated descriptor) can indicate that the electronic device 100 is located (or a likelihood that the electronic device 100 is located) in an environment or a location in the environment where an event of interest has previously been detected. In some examples, the keyframe matcher 122 can correlate the frame 210 and/or the features extracted from the frame 210 to a particular environment (and/or a location/region within the particular environment) based on a match between the features extracted from the frame 210 and the features keyframes in the event data 202. Such correlation can indicate that the electronic device 100 is located in the particular environment (and/or the location/region within the particular environment). Information about that the electronic device 100 being located in an environment or a location in the environment where an event of interest has previously been detected can be used to determine a likelihood that an event of interest will be detected again when the electronic device 100 is located in the environment or the location in the environment.

For example, in some cases, the likelihood that an event of interest will be observed/detected in an environment may increase or decrease depending on whether the event of interest has previously been observed/detected in that environment and/or the number of times that the event of interest has previously been observed/detected in that environment. To illustrate, a determination that an event of interest has been observed/detected frequently in a particular room can suggest a higher likelihood that the event of interest will be observed/detected again when electronic device 100 is in the particular room than a determination that no events of interest have previously been observed/detected in the particular room. Thus, a determination that the electronic device 100 is located in an environment or a location in the environment where an event of interest has previously been detected can be used to determine a likelihood that an event of interest will be detected again when the electronic device 100 is located in the environment or the location in the environment. As previously explained, in some examples, the determination that the electronic device 100 is located in an environment or location where an event of interest has previously been detected can be based on a match between features extracted from the frame 210 and features of one or more keyframes in the event data that are correlated with the particular environment or location.

As further described herein, the likelihood that the event of interest will be detected again when the electronic device 100 is located in the environment or the location in the environment can be used to control device and/or processing settings (e.g., power modes, operations, device configurations, processing configurations, processing pipelines, etc.) to reduce power consumption and increase power savings when the electronic device 100 is located in an environment (or location thereof) associated with a lower likelihood of an event detection. Similarly, the likelihood that the event of interest will be detected again when the electronic device 100 is located in the environment or the location in the environment can be used to control device and/or processing settings to increase a performance and/or operating state of the electronic device 100 when the electronic device 100 is located in an environment (or location thereof) associated with a higher likelihood of an event detection, such as increasing an event detection performance, an imaging and/or image processing performance (e.g., image/imaging quality, resolution, scaling, framerate, etc.), etc.

The keyframe matcher 122 can provide the mapper 124 a result of the comparison of the features extracted from the frame 210 and the features of keyframes in the event data 202. For example, the keyframe matcher 122 can provide the mapper 124 an indication that the features extracted from the frame 210 match features of a keyframe in the event data 202 or do not match features of any keyframes in the event data 202. The mapper 124 can use the information from the keyframe matcher 122 to determine whether to create a new keyframe (or replace an existing keyframe) associated with an event, and record (or update) an event count associated with that keyframe. For example, if the features extracted from the frame 210 match features of a keyframe in the event data 202, the mapper 124 can increase a count of detected events associated with that keyframe in the event data 202. In some examples, the mapper 124 can record or update an entry with a count of detected events associated with that keyframe.

In some cases, if the features extracted from the frame 210 do not match features of any keyframes in the event data 202, the mapper 124 can create a new keyframe in the event data 202, which (e.g., the new keyframe) can correspond to the frame 210. For example, as previously described, the electronic device 100 previously detected (e.g., via the image processing module 212) the one or more camera event detection triggers 214 based on the frame 210, which can indicate that an event of interest has been detected in the frame 210. Accordingly, if the features extracted from the frame 210 do not match features of any keyframes in the event data 202, the mapper 124 can add a new keyframe in the event data 202 corresponding to the frame 210. The new keyframe can associate the features from the frame 210 with a detected event of interest and/or an associated environment (and/or location thereof). The mapper 124 can include in the event data 202 an event detection count associated with the new keyframe, and can increment the count anytime a new frame (or features thereof) match the features associated with the new keyframe.

The mapper 124 can use the count of detected events associated with the keyframe (e.g., the new keyframe or an existing keyframe) corresponding to the frame 210 and features associated with the frame 210, to determine or update an event prior probability 216 associated with that keyframe. For example, in some cases, the mapper 124 can use a total and/or average count of events associated with the keyframe corresponding to the frame 210, and associated environment, and/or features associated with the frame 210, to determine or update an event prior probability 216 associated with that keyframe. The event prior probability 216 can include a value representing an estimated likelihood/probability of detecting an event of interest in an environment or location in an environment associated with the frame 210 and/or the features of the frame 210. For example, if the frame 210 was captured from a particular room and the visual features in the frame 210 correspond to the particular room or an area/object in the particular room, the event prior probability 216 can indicate an estimated likelihood of detecting an event of interest when the electronic device 100 is in the particular room (and/or in the area of the particular room) and/or when visual features in a frame captured in the particular room (or an area of the particular room) match visual features in a keyframe in the event data 202 that is associated with that particular room and/or the area/object in the particular room.

In some examples, the event prior probability 216 can be at least partly based on the count of detected events of interest recorded for a keyframe associated with the event prior probability 216. In some cases, the likelihood/probability value in the event prior probability 216 associated with a keyframe can increase as the count of detected events of interest associated with that keyframe increases. In some cases, the likelihood/probability value in the event prior probability 216 can be further based on one or more other factors such as, for example, an amount of time between the detected events of interest associated with the keyframe, an amount of time since the last detected event of interest associated with the keyframe and/or the last n number of detected events of interest associated with the keyframe, a type and/or characteristic of a detected event(s) of interest associated with the keyframe, a number of frames captured in an environment associated with the keyframe that have yielded a positive detection result relative to a number of frames captured in that environment that have yielded a negative detection result, one or more characteristics of the environment (e.g., a size of the environment, a number or density of potential events of interest in the environment, a common activity performed in the environment, etc.) associated with the keyframe, a frequency of use (and/or an amount of time of use) of the electronic device 100 in the environment associated with the keyframe (e.g., higher usage with lower positive detection results can be used to reduce a likelihood/probability value and vice versa), and/or any other factors.

For example, an increase or decrease in time between detected events of interest in an environment associated with the keyframe can be used to increase or decrease a likelihood/probability value in the event prior probability 216. As another example, an increase or decrease in the number of frames captured in the environment that have yielded a positive detection relative to the number of frames captured in that environment that have yielded a negative detection result can be used to increase or decrease the likelihood/probability value in the event prior probability 216. As yet another example, a number of detected events of interest in an environment relative to an amount of use of the electronic device 100 in that environment can be used to decrease or increase the likelihood/probability value in the event prior probability 216 (e.g., more use with less detected events of interest can result in a lower likelihood/probability value than less use with more detected events of interest or the same amount of detected events of interest).

The mapper 124 can provide the event prior probability 216 associated with the matched keyframe to the controller 126. The controller 126 can use the event prior probability 216 to control/adjust one or more settings associated with the image sensor 102 and/or the image processing associated with the image sensor 102. For example, the controller 126 can use the event prior probability 216 to adjust one or more settings to decrease a power consumption of the electronic device 100 when the event prior probability 216 indicates a lower likelihood/probability of an event of interest in a current environment of the electronic device 100, or adjust one or more settings to increase a performance and/or processing capabilities of the electronic device 100 (e.g., a performance of the image sensor 102) when the event prior probability 216 indicates a higher likelihood/probability of an event of interest in the current environment of the electronic device 100.

To illustrate, when the event prior probability 216 indicates a higher likelihood/probability of an event of interest in the current environment of the electronic device 100, the controller 126 can increase a framerate, resolution, scale factor, image stabilization, power mode, and/or other settings associated with the image sensor 102; invoke additional image sensors; implement an image processing pipeline and/or operations associated with higher performance, complexity, functionalities, and/or processing capabilities; invoke or initialize a higher-power or main camera device (e.g., image sensor 104); turn on an active depth transmitter system such as a structured light system or flood illuminator, dual camera system for depth and stereo or a time-of-flight camera component; etc.

On the other hand, when the event prior probability 216 indicates a lower likelihood/probability of an event of interest in the current environment of the electronic device 100, the controller 126 can turn off the image sensor 102; decrease a framerate, resolution, scale factor, image stabilization, and/or other settings associated with the image sensor 102; invoke a lower number of image sensors; implement an image processing pipeline and/or operations associated with lower power consumption, performance, complexity, functionalities, and/or processing capabilities; turn off an active depth transmitter system such as a structured light system or flood illuminator, dual camera system, a time-of-flight camera component; etc. This way, the controller 126 can increase power savings, performance, and/or capabilities of the electronic device 100 and associated components based on the likelihood/probability of a presence/occurrence of an event of interest in the current environment of the electronic device 100.

In some cases, the controller 126 can also modulate non-camera settings 220 based on the event prior probability 216 (e.g., based on the likelihood/probability of a presence/occurrence of an event of interest in the current environment of the electronic device 100). For example, the controller 126 can (e.g., based on the likelihood/probability of a presence/occurrence of an event of interest in the current environment of the electronic device 100) turn on/off, increase/decrease a power mode, and/or increase/decrease a processing capability and/or complexity of one or more components, algorithms, services, etc., such as an audio algorithm(s) (e.g., beamforming, etc.), location services (e.g., GNSS or GPS, WIFI, etc.), a tracking algorithm, an audio device (e.g., audio sensor 106), a non-camera workload, an additional processor, etc.

Figure 2B:
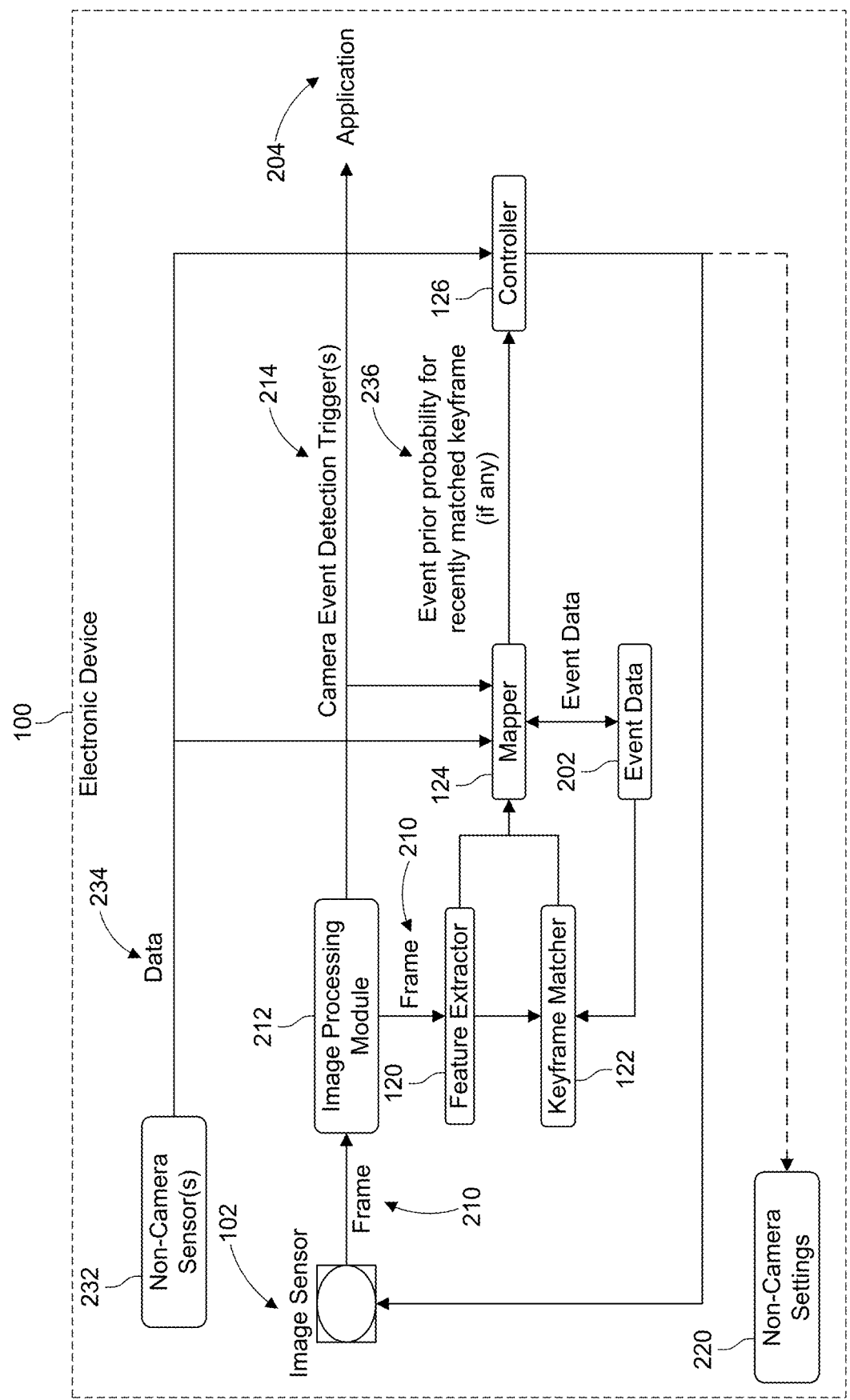

In some cases, the electronic device 100 can also leverage non-camera events to map events associated with an environment and control device settings (e.g., power states, operations, parameters, etc.) based on mapped events. For example, with reference to FIG. 2B, the electronic device 100 can use data 234 from non-camera sensors 232 to update the event data 202 (e.g., add new keyframes and associated detection counts, update existing keyframes and/or detection counts, remove existing keyframes and/or detection counts) and/or compute the event prior probability 236 for a matched keyframe.

The non-camera sensors 232 can include, for example and without limitation, an audio sensor (e.g., audio sensor 106), an IMU (e.g., IMU 108), a radar, a GNSS or GPS sensor/receiver, a wireless receiver (e.g., WIFI, cellular, etc.), etc. The data 234 from the non-camera sensor 232 can include, for example and without limitation, information about a location/position of the electronic device 100, a distance between the electronic device 100 and one or more objects, a location of one or more objects within an environment, a movement of the electronic device 100, sound captured in an environment, a time of one or more events, etc.

In some examples, the data 234 from the non-camera sensors 232 can be used to supplement data associated with updates (e.g., keyframes and/or associated data) to the event data 202. For example, the data 234 from the non-camera sensors 232 can be used to add timestamps of events associated with a keyframe added, updated or removed in the event data 202; indicate a location/position of the detected event associated with the keyframe; indicate a location/position of the electronic device 100 before, during, and/or after a detected event; an indication of movement of the electronic device 100 during the detected event, indicate a proximity of the electronic device 100 to the detected event, an indication of audio features associated with the detected event and/or environment, an indication of one or more characteristics of the environment (e.g., location, geometry, configuration, activity, objects, etc.), etc. The mapper 124 can use the data 234 in conjunction with features/descriptors and/or counts associated with keyframes in the event data 202 to help determine the likelihood/probability value in the event prior probability 236 of a matched keyframe; provide more granular information (e.g., location, activity, movement, time, etc.) about the environment, the electronic device 100, and/or the detected event associated with a matched keyframe; cull/eliminate stale keyframes; determine whether to add, update, or remove a keyframe (and/or associated information) to/in/from the event data 202; verify detected events; etc.

In some cases, the controller 126 can also use the data 234 from the non-camera sensors 232 to determine how or what settings to adjust/modulate as previously described. For example, the controller 126 can use the data 234 in conjunction with the event prior probability 236 to determine what setting of the image sensor 102 to adjust (and/or how), what settings from one or more other devices on the electronic device 100 to adjust (and/or how), which of the non-camera settings 220 to adjust (and/or how), etc. For example, as previously explained, in some cases, when the event prior probability indicates a higher likelihood of an event of interest occurring in a current environment of the electronic device 100, the controller 126 can increase a framerate of the image sensor 102 and/or activate a higher-power or main camera device with higher framerate capabilities (e.g., as compared to a camera device associated with image sensor 102). In this example, if the data 234 indicates a threshold amount of motion associated with the detected event of a matched keyframe and/or the electronic device 100, the controller 126 can increase the framerate of the image sensor 102 and/or the higher-power or main camera device more than if the data 234 indicates the amount of motion is below the threshold.

As another example, if the data 234 indicates that the electronic device 100 is approaching a location in an environment within a proximity of a location of a prior event of interest, the controller 126 can activate a higher-power or main camera device (e.g., a camera device having higher-power capabilities/settings as compared to a camera device associated with image sensor 102) and/or increase a setting of the image sensor 102 prior to the electronic device 100 reaching the location of the prior event of interest. Similarly, if the data 234 indicates that the electronic device 100 is moving away from the environment, the controller 126 can modulate one or more settings (e.g., turn off the image sensor 102 or another device, reduce a power mode of the image sensor 102 or another device, reduce a processing complexity and/or power consumption, etc.) to reduce a power consumption by the electronic device 100 even if an event of interest is determined to have a higher likelihood/probability (e.g., based on the event prior probability) of occurring in the environment. As yet another example, if the event prior probability indicates a higher likelihood of an event of interest occurring in the environment of the electronic device 100 and the data 234 indicates a threshold amount of motion by the electronic device 100 and/or one or more objects in the environment, the controller 126 can activate, and/or increase a complexity/performance of, an image stabilization setting/operation to ensure better image stabilization of any frames capturing an event of interest in the environment.

Figure 3A:
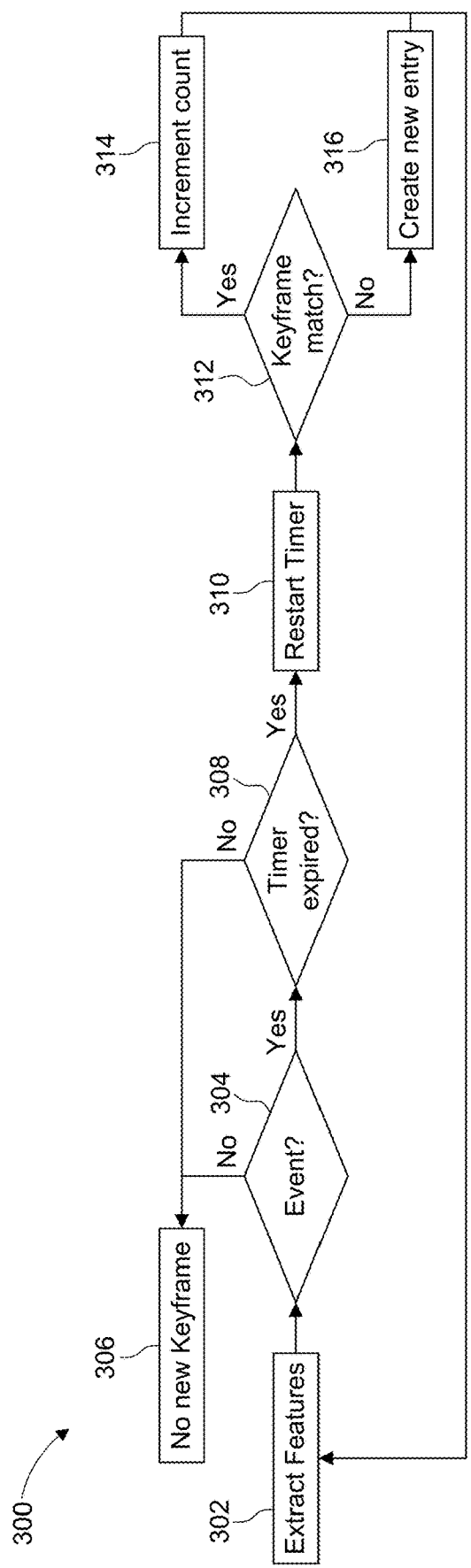
FIG. 3A and FIG. 3B are diagrams illustrating example processes for updating an event map, in accordance with some examples of the present disclosure.

FIG. 3A is a diagram illustrating an example process 300 for updating event data (e.g., event data 202). In this example, at block 302, the electronic device 100 can extract features from a frame captured by a camera device of the electronic device 100 (e.g., a camera device associated with image sensor 102, a camera device associated with image sensor 104).

At block 304, the electronic device 100 can determine, based on the extracted features, if an event of interest is detected in the frame. At block 306, if an event of interest is not detected in the frame, the electronic device 100 does not add a new keyframe to the event data. If an event of interest is detected in the frame, at block 308, the electronic device 100 can optionally determine if a timer has expired since a keyframe was created (e.g., was added to the event data) by the electronic device 100 and/or at block 312, the electronic device 100 can determine if a match has been identified between a keyframe in the event data and visual features extracted from a frame.

The timer can be programmable. In some cases, the timer (e.g., the amount of time configured to trigger expiration of the timer) can be determined based on one or more factors such as, for example, a usage history and/or pattern associated with the electronic device 100, a pattern of detection events (e.g., a pattern associated with previous detections of one or more events of interest), types of events of interest configured to trigger a detection event (e.g., trigger a detection of an event of interest), one or more characteristics of one or more environments, etc. In some examples, the timer can be set to prevent a larger number of keyframes from being created and/or to prevent keyframes from being created too frequently.

For example, assume the electronic device 100 detects a QR code in a frame capturing the QR code from a restaurant menu on a refrigerator in a kitchen, and creates a keyframe associated with the QR code detected in the restaurant menu on the refrigerator. The detection of the QR code and the creation of the keyframe can indicate that the electronic device 100 is in a same room (e.g., the kitchen) as the QR code and is likely to be in that same room for at least a period of time. In this example, the timer can prevent the electronic device 100 from creating additional keyframes of events associated with that environment while the electronic device 100 is likely to remain in that environment. Accordingly, the timer can reduce the volume of keyframes created within a period of time, a power consumption from creating additional keyframes within the period of time, and a use of resources in creating the additional keyframes within the period of time.

If the timer has not expired, the process 300 can return to block 306, where the electronic device 100 determines not to add a new keyframe to the event data. If the timer has expired, at block 310, the electronic device 100 can restart or reset the timer. At block 312, the electronic device 100 can determine whether the features extracted from a frame at block 302 match features of a keyframe in the event data. For example, the electronic device 100 can compare the features extracted from the frame at block 302 and/or an associated descriptor with features in keyframes in the event data and/or associated descriptors.

At block 314, if the electronic device 100 finds a match between the features extracted from the frame at block 302 and features of a keyframe in the event data, the electronic device 100 can increment a count of detection events (e.g., a count of previous detections of one or more events of interest) associated with the matching keyframe in the event data. At block 316, if the electronic device 100 does not find a match between the features extracted from the frame at block 302 and features of any keyframes in the event data, the electronic device 100 can create a new entry in the event data for the detection event (e.g., a detection of an event of interest) associated with the features extracted from the frame at block 302. In some examples, the new entry can include a keyframe containing the features extracted from the frame at block 302 and an event count indicating the number of occurrences of the event of interest associated with the detection event. In some examples, the new entry can also include a descriptor of the features associated with the keyframe.

Figure 3B:
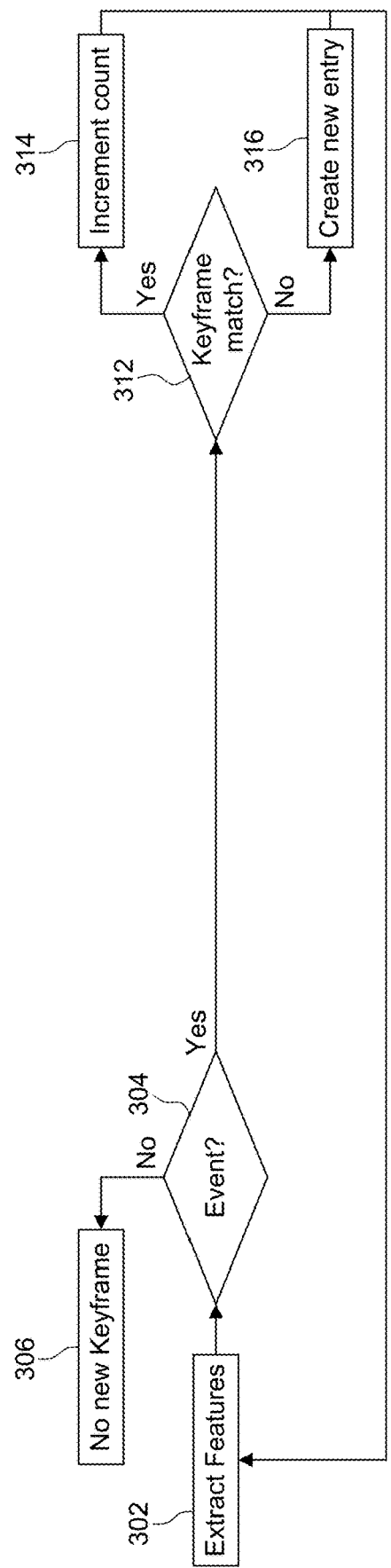

In some cases, the process 300 may not implement a timer and/or check if a timer has expired as described with respect to block 308 and block 310. For example, with reference to FIG. 3B, in some cases, after determining that an event of interest has been detected at block 304, the electronic device 100 can proceed to block 312 to determine if the features extracted from the frame at block 302 match features of a keyframe in the event data.

In other cases, the process 300 may implement a timer but checking if the timer has expired may be performed at a different point in the process. For example, in some cases, the electronic device 100 can check if the timer has expired prior (e.g., as described with respect to block 308) determining whether an event of interest has been detected (e.g., as described with respect to block 304). In some examples, if the timer has expired, the electronic device 100 can restart the timer (e.g., as described with respect to block 310) before determining whether an event of interest has been detected (e.g., as described with respect to block 304) or after determining that an event of interest has been detected.

Figure 4:
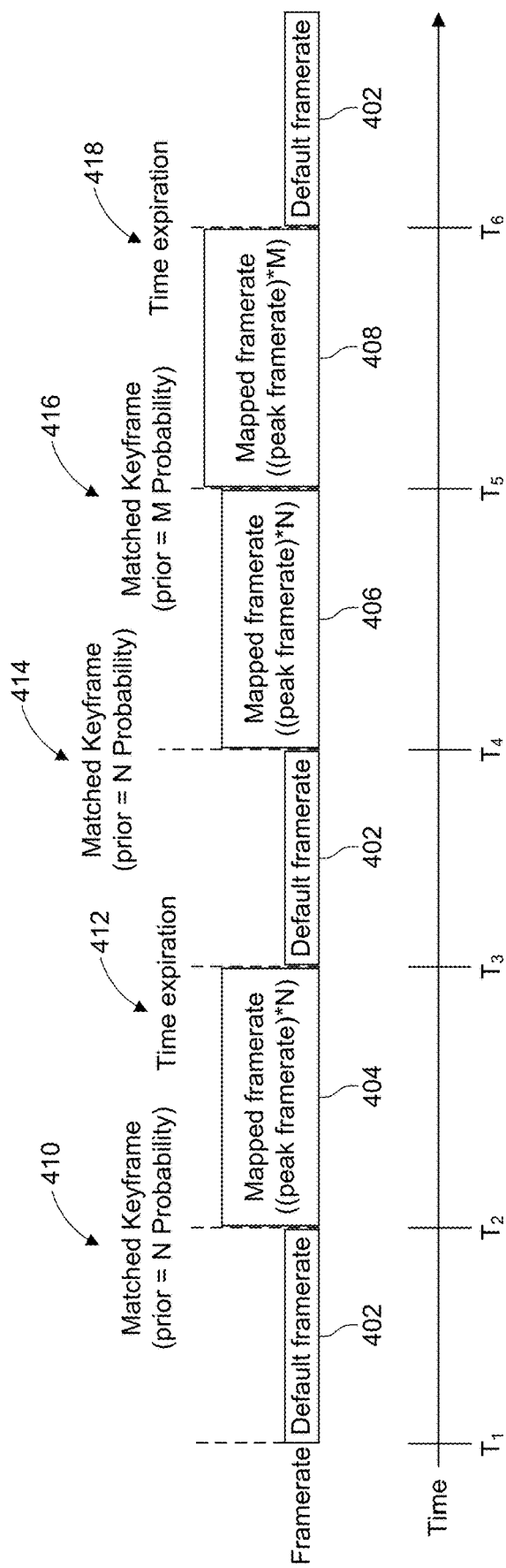
FIG. 4 is a diagram illustrating an example setting modulated at different times based on a match between features in a captured frame and features in a keyframe of event data, in accordance with some examples of the present disclosure.

FIG. 4 is a diagram illustrating an example setting modulated (e.g., via the controller 126) at different times based on a match between features in a captured frame and features in a keyframe on the event data (e.g., event data 202). In this example, the setting modulated is a framerate of a camera device (e.g., image sensor 102) of the electronic device 100. However, as previously explained, in other examples, the electronic device 100 can (additionally or alternatively) modulate (e.g., via the controller 126) other settings of the camera device, another device of the electronic device 100, an operation of the electronic device 100, a processing pipeline, etc.

In some examples, the camera device can implement a default framerate 402 at time $t_1$. The default framerate 402 can be any framerate that the camera device supports. For example, the default framerate 402 can be a lowest framerate of the camera device, a highest framerate of the camera device, or any other framerate supported by the camera device. In FIG. 4, the default framerate 402 is lower than the highest framerate supported by the camera device.

At time $t_2$, the electronic device 100 finds a matched keyframe 410 in the event data (e.g., event data 202) based on features in a frame captured in the default framerate 402. The matched keyframe 410 can include an event prior probability calculated based at least partly on a count of detection events associated with the keyframe 410 (e.g., a count of previous detections of one or more events of interest associated with the keyframe 410). In response to finding the matched keyframe 410, the electronic device 100 can determine (e.g., via the controller 126) a framerate 404 and change the framerate of the camera device from the default framerate 402 to the framerate 404. In some examples, the electronic device 100 can determine the framerate 404 based on the event prior probability associated with the matched keyframe 410. For example, the electronic device 100 can multiply a configurable or peak framerate associated with the camera device by a value of the event prior probability. To illustrate, if the value of the event prior probability is 0.75, the electronic device 100 can multiply the configurable or peak framerate by 0.75 to determine the framerate 404. In this example, the framerate 404 can be the result of the multiplication of the configurable or peak framerate by 0.75.

A peak framerate can be a configurable framerate used to determine framerates as described above. For example, the peak framerate can be a framerate selected from the framerates supported by the camera device. In some cases, the highest framerate supported by the camera device can be selected as the peak framerate.

The camera device can maintain the framerate 404 for a configurable period of time or until another keyframe match is found. In FIG. 4, at time $t_3$, the electronic device 100 determines that a timer 412 for maintaining the framerate 404 has expired before another keyframe match. Based on the expiration of the timer 412, the electronic device 100 can change the framerate of the camera device from the framerate 404 back to the default framerate 402.

At time $t_4$, the electronic device 100 finds a matched keyframe 414 in the event data (e.g., event data 202) based on features in a frame captured in the default framerate 402. The matched keyframe 414 can include an event prior probability as previously described. In response to finding the matched keyframe 414, the electronic device 100 can determine (e.g., via the controller 126) a framerate 406 and change the framerate of the camera device from the default framerate 402 to the framerate 406. The electronic device 100 can determine the framerate 406 based on the event prior probability associated with the matched keyframe 414. In some cases, the framerate 406 can be the same as the framerate 404. In other cases, the framerate 406 can be a higher or lower framerate than the framerate 404. For example, in some cases, the framerate 406 can be higher or lower than the framerate 404 depending on the value of the event prior probability associated with the matched keyframe 414 and/or the configurable or peak framerate used to calculate the framerate 406.

At time $t_5$, prior to an expiration of a timer, the electronic device 100 finds a matched keyframe 416 in the event data (e.g., event data 202) based on features in a frame captured in the framerate 406. The matched keyframe 416 can include an event prior probability as previously described. In response to finding the matched keyframe 416, the electronic device 100 can determine (e.g., via the controller 126) a framerate 408 and change the framerate of the camera device from the framerate 406 to the framerate 408. The electronic device 100 can determine the framerate 408 based on the event prior probability associated with the matched keyframe 416. In some examples, the framerate 408 can be a higher framerate than the framerate 406 based on a higher likelihood/probability value in the event prior probability associated with the matched keyframe 416 than the likelihood/probability value in the event prior probability associated with the matched keyframe 414. In other examples, the framerate 408 can be a lower framerate than the framerate 406 based on a lower likelihood/probability value in the event prior probability associated with the matched keyframe 416 than the likelihood/probability value in the event prior probability associated with the matched keyframe 414. In yet other examples, the framerate 408 can be a higher or lower framerate than the framerate 406 based on a different configurable or peak framerate used to determine the framerate 408 (e.g., as compared to the configurable or peak framerate used to determine the framerate 406).

At time $t_6$, the electronic device 100 determines that a timer 418 for maintaining the framerate 408 has expired before another keyframe match. Based on the expiration of the timer 418, the electronic device 100 can change the framerate of the camera device from the framerate 408 back to the default framerate 402. In some examples, the timer 418 can be the same as the timer 412. In other examples, the timer 418 can include a different expiration period than the timer 412.

In some cases, the electronic device 100 can implement a decaying default framerate. For example, a reduced framerate can be associated with an increased event detection latency (e.g., a higher framerate can result in a lower latency). For the default framerate 402, the electronic device 100 may default the framerate of a camera device to a lower framerate (e.g., which can result in a higher detection latency) when the event data contains a smaller number (e.g., below a threshold) of recorded events. For such cases, the electronic device 100 can implement a default framerate that begins high but decays as more events are added to the event data (e.g., as the electronic device 100 learns which locations/environments are most associated with events of interest).

To illustrate, when the event data includes a smaller number of events (e.g., below a threshold number of events), the default framerate can begin higher than when the event data includes a larger number of events (e.g., above a threshold number of events) to decrease a detection latency while the electronic device 100 is collecting more information about an event of interest and/or an associated environment in order better learn which locations/environments are most associated with the event of interest and/or increase an accuracy of a prior probability associated with a location/environment and/or event of interest. As more entries are added to the event data and the electronic device 100 has more robust data/statistics about the event of interest, the electronic device 100 can start to reduce the default framerate. The reduced default framerate can allow the electronic device 100 to reduce power consumption when the electronic device 100 has more data (e.g., more map entries) about an environment and/or event that it can use to increase a confidence and/or accuracy of a determined prior probability reflecting a likelihood of detecting an event of interest in a particular environment while the electronic device 100 is implementing the default framerate. Thus, the electronic device 100 can implement a higher default framerate when the amount of information it has to assess the likelihood of detecting an event of interest while implementing the default framerate is low in order to avoid a higher latency if an event of interest occurs, and can implement a lower default framerate when the amount of information increases (e.g., and an associated confidence of a lower likelihood of detecting an event) in order to decrease a power consumption by the camera device when no event of interest has been detected and/or a likelihood of detecting such an event is determined to be lower (e.g., below a threshold) based on the higher amount of relevant data.

Figure 5:
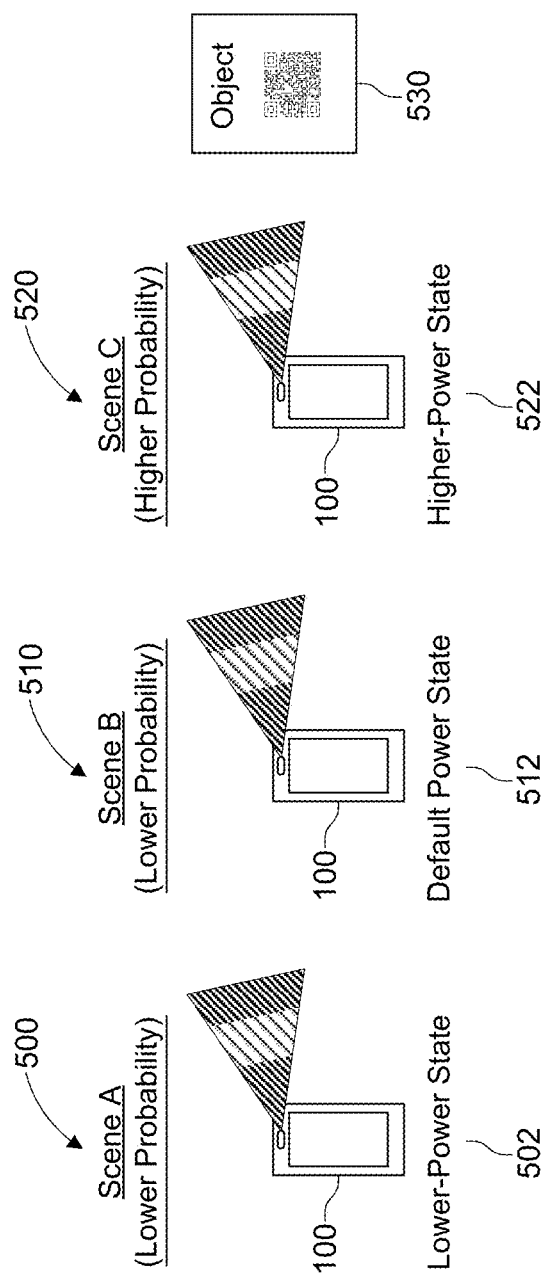
FIG. 5 is a diagram illustrating an example of different power states implemented when an electronic device is in different scenes, in accordance with some examples of the present disclosure.

FIG. 5 is a diagram illustrating an example of different power states implemented when the electronic device 100 is in different scenes. In this example, the electronic device 100 is running in a lower-power state 502 when located in a scene 500 having a lower likelihood/probability of detecting/encountering an event of interest. The lower-power state 502 can be based on a likelihood/probability of detecting/encountering an event of interest in the scene 500. The lower-power state 502 can include, for example, a lower-power setting or mode of a camera device of the electronic device 100 (e.g., as compared to a higher-power setting or mode supported by the camera device or another camera device). In some examples, the lower-power state 502 can also include a lower-power operation and/or processing pipeline implemented to process frames captured by the camera device of the electronic device 100. For example, the lower-power state 502 can include a setting to implement an image processing operation(s) or image processing pipeline associated with a reduced processing complexity and/or power consumption. In some examples, the lower-power state 502 can also include a lower-power setting or mode of another device of the electronic device 100, such as a sensor(s), a processor, another camera device, and/or any other device.

The scene 510 also has a lower likelihood/probability of detecting/encountering an event of interest. When the electronic device 100 is located at scene 510, the electronic device 100 can implement a default power state 512. The default power state 512 can be based on a likelihood/probability of detecting/encountering an event of interest in the scene 510. The default power state 512 at scene 510 can be the same as or different than the lower-power state 502 at scene 500. In some examples, the default power state 512 can be associated with a lower power consumption than the lower-power state 502. In some examples, the default power state 512 can be a lowest power setting or mode supported by a camera device of the electronic device 100. In other examples, the default power state 512 can be associated with the same or higher power consumption as the lower-power state 502. In some cases, the default power state 512 can include a default framerate, such as the default framerate 402 shown in FIG. 4.

On the other hand, the scene 520 has a higher likelihood/probability of detecting/encountering an event of interest. Here, the electronic device 100 can implement a higher-power state 522 based on the higher likelihood/probability of detecting/encountering an event of interest in scene 520. In some examples, the higher-power state 522 can include a higher-power setting of a camera device or an image processing pipeline (e.g., a higher framerate, a higher upconversion, a higher resolution, a higher number of image sensors invoked, a higher-fidelity image processing pipeline, etc.). In some examples, the higher-power state 522 can include a state in which the electronic device 100 activates and/or uses a higher-power camera device based on the higher likelihood/probability. For example, in the higher-power state 522, the electronic device 100 can activate and/or implement a higher-power or main camera device with higher capabilities, a processing pipeline with higher complexity/fidelity, etc., than a lower-power camera device implemented by the electronic device 100 at scene 500 and scene 510.

When the electronic device 100 encounters object 530 at scene 520, the electronic device 100 can capture an image (e.g., via image sensor 102 and/or image sensor 104) of the object 530. The electronic device 100 can capture the image of the object 530 while in the higher-power state 522, and perform object detection to detect the object 530 in the image. In some examples, the higher-power state 522 can allow the electronic device 100 to capture a higher-quality image (e.g., higher resolution, higher framerate, etc.) than when in the lower-power state 502 or the default power state 512. In some examples, the higher-power state 522 can allow the electronic device 100 to perform more robust/complex and/or higher-fidelity processing of the image than when in the lower-power state 502 or the default power state 512.

Figure 6:
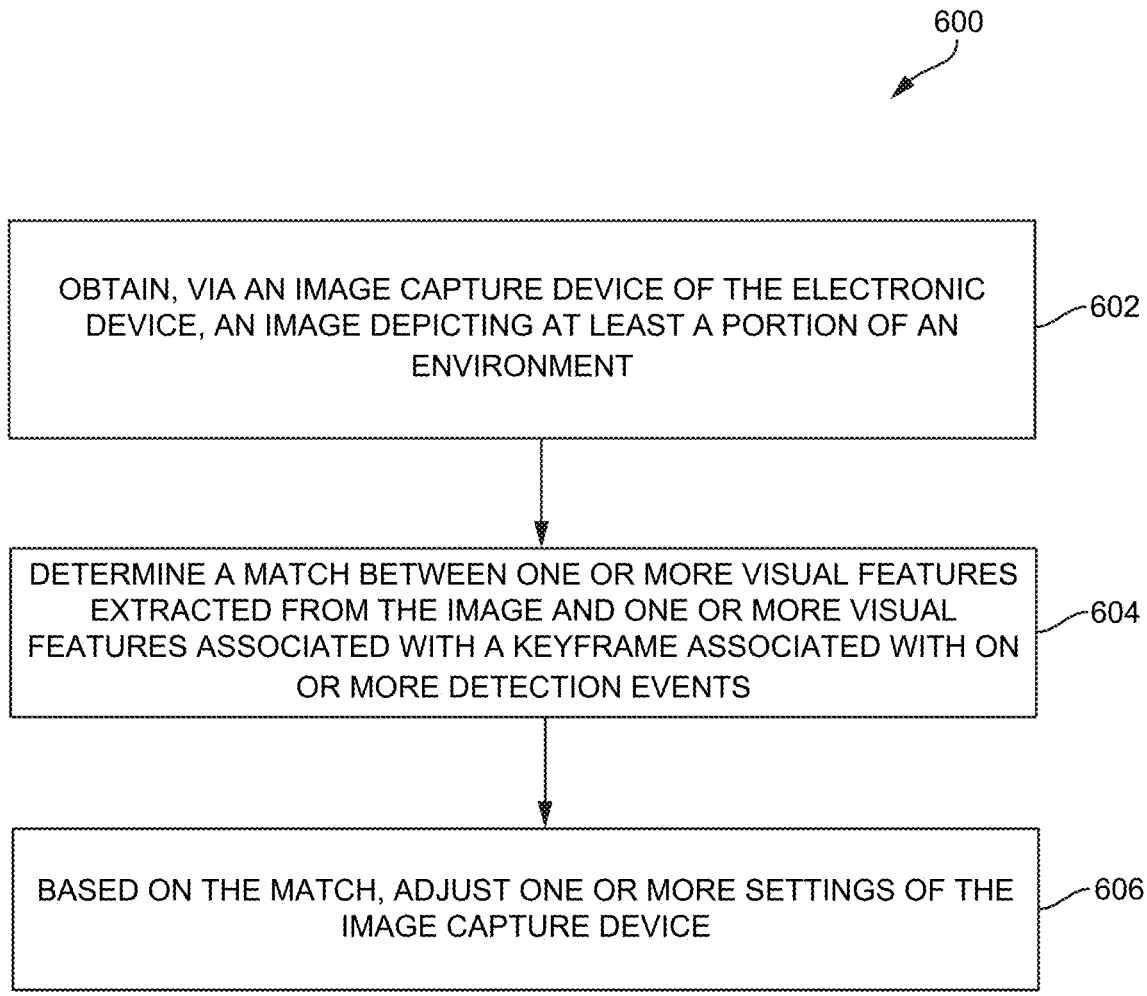
FIG. 6 is a flowchart illustrating an example process for adjusting camera settings based on event data, in accordance with some examples of the present disclosure.

FIG. 6 is a flowchart illustrating an example process 600 for adjusting camera settings based on event data. At block 602, the process 600 can include obtaining, via an image capture device (e.g., image sensor 102) of an electronic device (e.g., electronic device 100), an image (e.g., a frame) depicting at least a portion of an environment. The environment can include, for example and without limitation, a room (e.g., a kitchen, a bedroom, an office, a living room, a garage, a basement, etc.), a space or area (e.g., a yard, a patio, a staircase, a field, a park, etc.), and/or any other environment.

At block 604, the process 600 can include determining a match between one or more visual features extracted from the image and one or more visual features associated with a keyframe. In some cases, the keyframe can include one of a plurality of keyframes in event data (e.g., event data 202) on the electronic device. In some examples, the keyframe can be associated with one or more detection events. For example, the keyframe can include visual features of an event previously captured by an image and detected in the image by the electronic device. In some examples, the one or more detection events can include a detection of a face captured by the image, a hand gesture captured by the image, an emotion captured by the image, a scene captured by the image, one or more people captured by the image, an animal captured by the image, a machine-readable code (e.g., a QR code, a barcode, a link, etc.) captured by the image, an infrared light captured by the image, a two-dimensional surface or plane captured by the image, and/or text captured by the image.

In some examples, the event data can contain a number of keyframes from detection events associated with the image capture device and/or a respective count of detection events associated with each keyframe of the number of keyframes in the event data.

In some examples, determining the match between one or more visual features extracted from the image and one or more visual features associated with the keyframe in the event data can include comparing the one or more visual features extracted from the image with the one or more visual features associated with the keyframe and/or comparing a first descriptor of the one or more visual features extracted from the image with a second descriptor of the one or more visual features associated with the keyframe.

In some cases, the process 600 can include estimating, based on the match, a likelihood of an event of interest occurring in the environment. In some examples, the electronic device can calculate an event prior probability including a likelihood or probability value representing an estimated likelihood of an event of interest occurring in the environment.

At block 606, the process 600 can include adjusting (e.g., modifying/modulating) one or more settings of the image capture device based on the match. In some cases, the process 600 can include adjusting the one or more settings of the image capture device further based on a likelihood of an event of interest occurring in the environment.

In some examples, adjusting the one or more settings of the image capture device can include modifying a power mode of the image capture device. In some cases, modifying the power mode of the image capture device can include modifying a framerate of the image capture device, a resolution of the image capture device, a binning mode of the image capture device, an imaging mode of the image capture device, and/or a number of image sensors invoked by the image capture device and/or the electronic device.

In some examples, modifying the power mode of the image capture device can include decreasing, based on a determination that a likelihood of an event of interest occurring in the environment is below a threshold, the framerate, the resolution, the binning mode, a scaling factor, an imaging mode, and/or the number of image sensors invoked. In some examples, modifying the power mode of the image capture device can include increasing, based on a determination that a likelihood of an event of interest occurring in the environment is above a threshold, the framerate, the resolution, the binning mode, a scaling factor, an imaging mode, and/or the number of image sensors invoked.

In some examples, the image capture device can include a first image capture device. In some aspects, the process 600 can include increasing, based on a determination that a likelihood of an event of interest occurring in the environment is above a threshold, a power mode of a second image capture device of the electronic device. In some cases, the second image capture device can employ a higher-power mode than the first image capture device, a higher framerate than the first image capture device, a higher resolution than the first image capture device, a higher number of image sensors than the first image capture device, and/or a higher-power processing pipeline than a processing pipeline associated with the first image capture device. In some examples, increasing the power mode of the second image capture device can include turning on the second image capture device and/or initializing the second image capture device.

In some cases, the keyframe can be contained or included in event data (e.g., event data 202) at the electronic device. In some examples, the event data 202 can include an event map correlating features of one or more keyframes associated with one or more environments (and/or one or more portions of the one or more environments) with the one or more environments. In some cases, the event data can include the keyframe. In some examples, the event data can include a plurality of keyframes from previous detection events (e.g., previous detections of one or more events of interest) by the image capture device. In some cases, the event data can also include a respective count of detection events associated with each keyframe of the plurality of keyframes.

In some examples, the process 600 can include estimating a likelihood of an event of interest occurring in the environment. In some cases, estimating the likelihood of the event of interest occurring in the environment can include estimating the likelihood of the detection event occurring in the environment based on the match and a respective count of detection events (e.g., previous detections of an event(s) of interest) associated with the keyframe. In some examples, the process 600 can include increasing, in response to determining the match between one or more visual features extracted from the image and one or more visual features associated with the keyframe, the respective count of detection events associated with the keyframe.

In some examples, the process 600 can include obtaining, via the image capture device, a different image depicting at least a portion of a different environment; determining that one or more visual features extracted from the different image do not match visual features associated with any keyframe in event data at the electronic device; and creating a new entry in the event data corresponding to the different image. In some cases, the new entry is created in response to determining that the one or more visual features extracted from the different image do not match visual features associated with any keyframe in the event data and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

In some examples, the process 600 can include determining that the event of interest was detected in the different image; based on the determination that the event of interest was detected in the different image, determining a second likelihood of an additional event of interest occurring in the different environment; and adjusting at least one setting of the image capture device based on the second likelihood of the additional event of interest occurring in the different environment.

In some examples, the one or more settings of the image capture device can include a framerate, and the process 600 can include determining the framerate based on a pre-determined framerate for detection events and a likelihood of an event of interest occurring in the environment; and maintaining the framerate until at least an expiration of a configured period of time (e.g., expiration of a timer) or a determination of a subsequent match between a different image captured by the image capture device and at least one keyframe in the event data. In some examples, the process 600 can include adjusting, after expiration of the configured period of time or the determination of the subsequent match, the framerate of the image capture device to a different framerate. In some cases, the different framerate can include a default framerate or a particular framerate calculated based on the pre-determined framerate and a different likelihood of a detection event associated with the subsequent match. In some cases, the different framerate can include a default framerate or a particular framerate determined based on the pre-determined framerate and a second likelihood of detecting a particular event of interest associated with the subsequent match.

In some cases, the pre-determined framerate can include a highest framerate supported by the image capture device. In some examples, determining the framerate can include multiplying the pre-determined framerate by a value corresponding to a likelihood of an event of interest occurring in the environment. In some cases, the pre-determined framerate is higher than the default framerate. In some examples, the process 600 can include reducing, in response to adding one or more keyframes to the event data, the default framerate to a lower framerate.

In some examples, the process 600 can include adjusting, based on a likelihood of an event of interest occurring in the environment, one or more different settings of an active depth transmitter system such as a flood illuminator of the electronic device, an depth sensor device of the electronic device, a dual image capture device system of the electronic device, a structured light system of the electronic device, a time-of-flight system of the electronic device, etc. In some cases, the process 600 can include adjusting, based on the likelihood of the event of interest occurring in the environment, one or more settings of an audio algorithm, a location service associated with at least one of a global navigation satellite (GNSS) system, a wireless location area network connection and/or data (e.g., WIFI), and/or a global positioning system (GPS). In some examples, adjusting the one or more different settings can include turning off or implementing (e.g., turning on, activating, initializing, powering up, etc.) the flood illuminator, the depth sensor device, the dual image capture device system, the structured light system, the time-of-flight system, the audio algorithm, and/or the location service. In some examples, adjusting the one or more different settings can include turning off or implementing the active depth transmitter.

In some aspects, the process 600 can include determining, based on the match, a likelihood of an event of interest occurring in the environment; and adjusting the one or more settings of the image capture device further based on the likelihood of the event of interest occurring in the environment.

In some aspects, the process 600 can include determining the likelihood of the event further based on data from a non-image capture device of the electronic device; or adjusting the one or more settings of the image capture device further based on the data from the non-image capture device of the electronic device.

In some examples, the process 600 can include periodically decreasing respective counts of detection events associated with keyframe entries in the event data. In some cases, the respective counts of detection events are proportionally decreased across all keyframe entries in the event data.

In some examples, the process 600 may be performed by one or more computing devices or apparatuses. In one illustrative example, the process 600 can be performed by the electronic device 100 shown in FIG. 1. In some examples, the process 600 can be performed by one or more computing devices with the computing device architecture 700 shown in FIG. 7. In some cases, such a computing device or apparatus may include a processor, microprocessor, microcomputer, or other component of a device that is configured to carry out the steps of the process 600. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
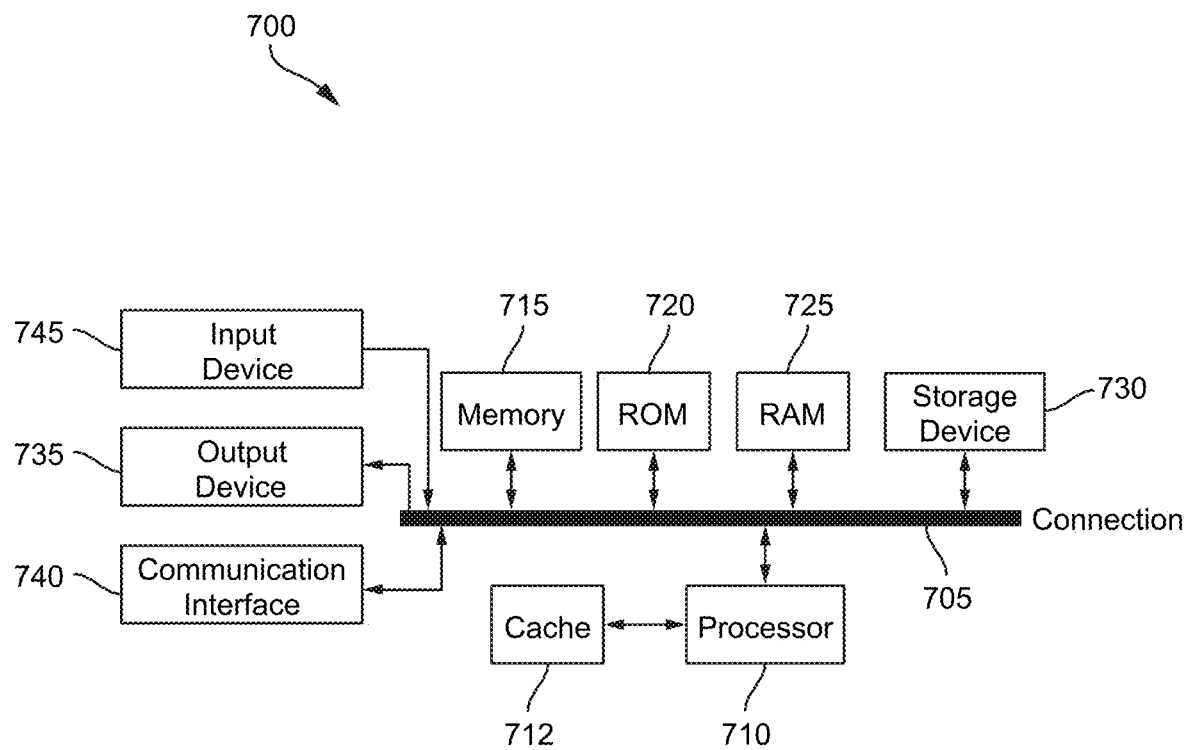
FIG. 7 illustrates an example computing device architecture, in accordance with some examples of the present disclosure.

FIG. 7 illustrates an example computing device architecture 700 of an example computing device which can implement various techniques described herein. For example, the computing device architecture 700 can implement at least some portions of the electronic device 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics.

The processor 710 can include any general-purpose processor and a hardware or software service stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software, code, firmware, etc., for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for obtaining an image, the apparatus comprising: memory; and one or more processors coupled to the memory, the one or more processors being configured to: obtain, via an image capture device of the apparatus, an image depicting at least a portion of an environment; determine a match between one or more visual features extracted from the image and one or more visual features associated with a keyframe associated with one or more detection events; and based on the match, adjust one or more settings of the image capture device.

Aspect 2. The apparatus of Aspect 1, wherein, to adjust the one or more settings of the image capture device, the one or more processors are configured to modify a power mode of the image capture device.

Aspect 3. The apparatus of Aspect 2, wherein, to modify the power mode of the image capture device, the one or more processors are configured to modify at least one of a framerate of the image capture device, a resolution of the image capture device, a binning mode of the image capture device, an imaging mode of the image capture device, and a number of image sensors invoked by at least one of the image capture device and the apparatus.

Aspect 4. The apparatus of Aspect 3, wherein, to modify the power mode of the image capture device, the one or more processors are configured to: based on a determination that a likelihood of an event of interest occurring in the environment is below a threshold, decrease at least one of the framerate, the resolution, the binning mode, the imaging mode, and the number of image sensors invoked.

Aspect 5. The apparatus of Aspect 3, wherein, to modify the power mode of the image capture device, the one or more processors are configured to: based on a determination that a likelihood of an event of interest occurring in the environment is above a threshold, increase at least one of the framerate, the resolution, the binning mode, the imaging mode, and the number of image sensors invoked.

Aspect 6. The apparatus of any of Aspects 1 to 5, wherein the image capture device comprises a first image capture device, and wherein the one or more processors are configured to: based on a determination that a likelihood of an event of interest occurring in the environment is above a threshold, increase a power mode of a second image capture device of the apparatus, wherein the second image capture device employs at least one of a higher-power mode than the first image capture device, a higher framerate than the first image capture device, a higher resolution than the first image capture device, a higher number of image sensors than the first image capture device, and a higher-power processing pipeline than a processing pipeline associated with the first image capture device.

Aspect 7. The apparatus of Aspect 6, wherein, to increase the power mode of the second image capture device, the one or more processors are configured to initialize the second image capture device.

Aspect 8. The apparatus of any of Aspects 1 to 7, wherein the keyframe is contained in event data at the apparatus, and wherein the event data contains a number of keyframes from detection events associated with the image capture device.

Aspect 9. The apparatus of Aspect 8, wherein the event data further contains a respective count of detection events associated with each keyframe of the number of keyframes.

Aspect 10. The apparatus of any of Aspects 8 to 9, wherein the one or more processors are configured to determine a likelihood of an event of interest occurring in the environment, and wherein, to determine the likelihood of the event occurring in the environment, the one or more processors are configured to determine the likelihood of the event occurring in the environment based on the match and the respective count of detection events associated with the keyframe.

Aspect 11. The apparatus of any of Aspects 9 to 10, wherein the one or more processors are configured to: in response to determining the match between one or more visual features extracted from the image and one or more visual features associated with the keyframe, increase the respective count of detection events associated with the keyframe in the event data.

Aspect 12. The apparatus of any of Aspects 9 to 11, wherein the one or more processors are configured to determine a likelihood of an event of interest occurring in the environment, and wherein, to determine the likelihood of the event occurring in the environment, the one or more processors are configured to: determine the likelihood of the event occurring in the environment based on the match and one or more keyframes from the number of keyframes.

Aspect 13. The apparatus of any of Aspects 1 to 12, wherein the one or more processors are configured to: obtain, via the image capture device, a different image depicting at least a portion of a different environment; determine that one or more visual features extracted from the different image do not match visual features associated with any keyframe in event data at the apparatus; and create a new entry in the event data corresponding to the different image, the new entry being created in response to determining that the one or more visual features extracted from the different image do not match visual features associated with any keyframe in the event data and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

Aspect 14. The apparatus of Aspect 13, wherein the one or more processors are configured to: determine that the event of interest was detected in the different image; based on the determination that the event of interest was detected in the different image, determine a second likelihood of an additional event of interest occurring in the different environment; and adjust at least one setting of the image capture device based on the second likelihood of the additional event of interest occurring in the different environment.

Aspect 15. The apparatus of any of Aspects 1 to 14, wherein the one or more settings of the image capture device comprise a framerate, and wherein the one or more processors are configured to: determine the framerate based on a pre-determined framerate for detection events and a likelihood of an event of interest occurring in the environment; and maintain the framerate until at least an expiration of a configured period of time or a determination of a subsequent match between a different image captured by the image capture device and at least one keyframe in event data at the apparatus.

Aspect 16. The apparatus of Aspect 15, wherein the one or more processors are configured to: after expiration of the configured period of time or the determination of the subsequent match, adjust the framerate of the image capture device to a different framerate.

Aspect 17. The apparatus of Aspect 16, wherein the different framerate comprises a default framerate or a particular framerate determined based on the pre-determined framerate and a second likelihood of detecting a particular event of interest associated with the subsequent match.

Aspect 18. The apparatus of any of Aspects 15 to 17, wherein the pre-determined framerate is higher than the default framerate, and wherein the one or more processors are configured to: in response to adding one or more keyframes to event data at the apparatus, reduce the default framerate to a lower framerate.

Aspect 19. The apparatus of Aspect 16, wherein the pre-determined framerate comprises a highest framerate supported by the image capture device, and wherein, to determine the framerate, the one or more processors are configured to multiply the pre-determined framerate by a value corresponding to the likelihood of the detection event occurring in the environment.

Aspect 20. The apparatus of any of Aspects 1 to 19, wherein, to determine the match between one or more visual features extracted from the image and one or more visual features associated with the keyframe, the one or more processors are configured to: compare at least one of the one or more visual features extracted from the image with the one or more visual features associated with the keyframe and a first descriptor of the one or more visual features extracted from the image with a second descriptor of the one or more visual features associated with the keyframe.

Aspect 21. The apparatus of any of Aspects 1 to 20, wherein the one or more processors are configured to: based on a likelihood of an event of interest occurring in the environment, adjust one or more different settings of at least one of an active depth transmitter of the apparatus, an audio algorithm, a location service associated with at least one of a global navigation satellite (GNSS) system, a wireless location area network connection, and a global positioning system (GPS).

Aspect 22. The apparatus of Aspect 21, wherein, to adjust the one or more different settings, the one or more processors are configured to turn off or implement at least one of the active depth transmitter, the audio algorithm, and the location service.

Aspect 23. The apparatus of any of Aspects 1 to 22, wherein the one or more processors are configured to: periodically decrease respective counts of detection events associated with keyframe entries in event data at the apparatus, the respective counts of detection events being proportionally decreased across all keyframe entries in the event data.

Aspect 24. The apparatus of any of Aspects 1 to 23, wherein the one or more detection events comprise a detection of at least one of a face depicted by the image, a hand gesture depicted by the image, an emotion depicted by the image, a scene depicted by the image, one or more people depicted by the image, an animal depicted by the image, a machine-readable code depicted by the image, an infrared light depicted by the image, a two-dimensional surface depicted by the image, and text depicted by the image.

Aspect 25. The apparatus of any of Aspects 1 to 24, wherein the keyframe is part of the event data at the apparatus, and wherein the event data comprises a plurality of keyframes.

Aspect 26. The apparatus of any of Aspects 1 to 25, wherein the one or more processors are configured to: based on the match, determine a likelihood of an event of interest occurring in the environment; and adjust the one or more settings of the image capture device further based on the likelihood of the event of interest occurring in the environment.

Aspect 27. The apparatus of Aspect 26, wherein the one or more processors are further configured to: determine the likelihood of the event further based on data from a non-image capture device of the apparatus; or adjust the one or more settings of the image capture device further based on the data from the non-image capture device of the apparatus.

Aspect 28. The apparatus of any of Aspects 1 to 27, wherein the apparatus comprises a mobile device.

Aspect 29. The apparatus of any of Aspects 1 to 28, wherein the apparatus comprises an augmented reality device.

Aspect 30. A method for obtaining an image, the method comprising: obtaining, via an image capture device of an electronic device, an image depicting at least a portion of an environment; determining a match between one or more visual features extracted from the image and one or more visual features associated with a keyframe associated with one or more detection events; and based on the match, adjusting one or more settings of the image capture device.

Aspect 31. The method of Aspect 30, wherein adjusting the one or more settings of the image capture device comprises modifying a power mode of the image capture device.

Aspect 32. The method of Aspect 31, wherein modifying the power mode of the image capture device comprises modifying at least one of a framerate of the image capture device, a resolution of the image capture device, a binning mode of the image capture device, an imaging mode of the image capture device, and a number of image sensors invoked by at least one of the image capture device and the electronic device.

Aspect 33. The method of any of Aspects 31 to 32, wherein modifying the power mode of the image capture device comprises: based on a determination that a likelihood of an event of interest occurring in the environment is below a threshold, decreasing at least one of the framerate, the resolution, the binning mode, the imaging mode, and the number of image sensors invoked.

Aspect 34. The method of any of Aspects 31 to 32, wherein modifying the power mode of the image capture device comprises: based on a determination that a likelihood of an event of interest occurring in the environment is above a threshold, increasing at least one of the framerate, the resolution, the binning mode, the imaging mode, and the number of image sensors invoked.

Aspect 35. The method of any of Aspects 30 to 34, wherein the image capture device comprises a first image capture device, and wherein the method further comprises: based on a determination that a likelihood of an event of interest occurring in the environment is above a threshold, increasing a power mode of a second image capture device of the electronic device, wherein the second image capture device employs at least one of a higher-power mode than the first image capture device, a higher framerate than the first image capture device, a higher resolution than the first image capture device, a higher number of image sensors than the first image capture device, and a higher-power processing pipeline than a processing pipeline associated with the first image capture device.

Aspect 36. The method of Aspect 35, wherein increasing the power mode of the second image capture device comprises initializing the second image capture device.

Aspect 37. The method of any of Aspects 30 to 36, wherein the keyframe is contained in event data at the electronic device, and wherein the event data contains a number of keyframes from detection events associated with the image capture device.

Aspect 38. The method of Aspect 37, wherein the event data further contains a respective count of detection events associated with each keyframe of the number of keyframes.

Aspect 39. The method of any of Aspects 37 to 38, further comprising determining a likelihood of an event of interest occurring in the environment based on the match and the respective count of detection events associated with the keyframe.

Aspect 40. The method of any of Aspects 38 to 39, further comprising: in response to determining the match between one or more visual features extracted from the image and one or more visual features associated with the keyframe, increasing the respective count of detection events associated with the keyframe in the event data.

Aspect 41. The method of any of Aspects 38 to 40, further comprising: determining a likelihood of an event of interest occurring in the environment based on the match and one or more keyframes from the number of keyframes.

Aspect 42. The method of any of Aspects 30 to 41, further comprising: obtaining, via the image capture device, a different image depicting at least a portion of a different environment; determining that one or more visual features extracted from the different image do not match visual features associated with any keyframe in event data at the electronic device; and creating a new entry in the event data corresponding to the different image, the new entry being created in response to determining that the one or more visual features extracted from the different image do not match visual features associated with any keyframe in the event data and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

Aspect 43. The method of Aspect 42, further comprising: determining that the event of interest was detected in the different image; based on the determination that the event of interest was detected in the different image, determining a second likelihood of an additional event of interest occurring in the different environment; and adjusting at least one setting of the image capture device based on the second likelihood of the additional event of interest occurring in the different environment.

Aspect 44. The method of any of Aspects 30 to 43, wherein the one or more settings of the image capture device comprise a framerate, and wherein the method further comprises: determining the framerate based on a pre-determined framerate for detection events and a likelihood of an event of interest occurring in the environment; and maintaining the framerate until at least an expiration of a configured period of time or a determination of a subsequent match between a different image captured by the image capture device and at least one keyframe in event data at the electronic device.

Aspect 45. The method of Aspect 44, further comprising: after expiration of the configured period of time or the determination of the subsequent match, adjusting the framerate of the image capture device to a different framerate.

Aspect 46. The method of Aspect 45, wherein the different framerate comprises a default framerate or a particular framerate determined based on the pre-determined framerate and a second likelihood of detecting a particular event of interest associated with the subsequent match.

Aspect 47. The method of any of Aspects 44 to 46, wherein the pre-determined framerate is higher than the default framerate, and wherein the method further comprises: in response to adding one or more keyframes to event data at the electronic device, reducing the default framerate to a lower framerate.

Aspect 48. The method of Aspect 47, wherein the pre-determined framerate comprises a highest framerate supported by the image capture device, and wherein determining the framerate can include multiplying the pre-determined framerate by a value corresponding to the likelihood of the detection event occurring in the environment.

Aspect 49. The method of any of Aspects 30 to 48, wherein determining the match between one or more visual features extracted from the image and one or more visual features associated with the keyframe further comprises: comparing at least one of the one or more visual features extracted from the image with the one or more visual features associated with the keyframe and a first descriptor of the one or more visual features extracted from the image with a second descriptor of the one or more visual features associated with the keyframe.

Aspect 50. The method of any of Aspects 30 to 49, further comprising: based on a likelihood of an event of interest occurring in the environment, adjusting one or more different settings of at least one of an active depth transmitter of the electronic device, an audio algorithm, a location service associated with at least one of a global navigation satellite (GNSS) system, a wireless location area network connection, and a global positioning system (GPS).

Aspect 51. The method of Aspect 50, wherein adjusting the one or more different settings comprises turning off or implementing at least one of the active depth transmitter, the audio algorithm, and the location service.

Aspect 52. The method of any of Aspects 30 to 51, further comprising: periodically decreasing respective counts of detection events associated with keyframe entries in event data at the electronic device, the respective counts of detection events being proportionally decreased across all keyframe entries in the event data.

Aspect 53. The method of any of Aspects 30 to 52, wherein the one or more detection events comprise a detection of at least one of a face depicted by the image, a hand gesture depicted by the image, an emotion depicted by the image, a scene depicted by the image, one or more people depicted by the image, an animal depicted by the image, a machine-readable code depicted by the image, an infrared light depicted by the image, a two-dimensional surface depicted by the image, and text depicted by the image.

Aspect 54. The method of any of Aspects 30 to 53, wherein the keyframe is part of the event data at the electronic device, and wherein the event data comprises a plurality of keyframes.

Aspect 55. The method of any of Aspects 30 to 54, further comprising: based on the match, determining a likelihood of an event of interest occurring in the environment; and adjusting the one or more settings of the image capture device further based on the likelihood of the event of interest occurring in the environment.

Aspect 56. The method of Aspect 55, further comprising: determining the likelihood of the event further based on data from a non-image capture device of the electronic device; or adjusting the one or more settings of the image capture device further based on the data from the non-image capture device of the electronic device.

Aspect 57. The method of any of Aspects 30 to 56, wherein the electronic device comprises a mobile device.

Aspect 58. The method of any of Aspects 30 to 57, wherein the electronic device comprises an augmented reality device.

Aspect 59. An apparatus comprising means for performing a method according to any of Aspects 30 to 58.

Aspect 60. The apparatus of Aspect 59, wherein the apparatus comprises a mobile device.

Aspect 61. The method of any of Aspects 59 to 60, wherein the apparatus comprises an augmented reality device.

Aspect 62. A non-transitory computer-readable medium having stored thereon instructions which, when executed by one or more processors, cause the one or more processors to perform a method according to any of Aspects 30 to 58.

Aspect 63. The non-transitory computer-readable medium of Aspect 62, wherein the electronic device comprises a mobile device.

Aspect 64. The non-transitory computer-readable medium of any of Aspects 62 to 63, wherein the electronic device comprises an augmented reality device.

What is claimed is:
1. An apparatus for obtaining an image, the apparatus comprising:
   memory; and
   one or more processors coupled to the memory, the one or more processors being configured to:

obtain, via an image capture device of the apparatus, a key frame depicting at least a portion of an environment;

identify a detection event associated with the apparatus;

generate an event entry in the memory based on the keyframe and the detection event;

determine a match between one or more visual features extracted from a first image obtained via the image capture device and one or more visual features associated with the keyframe;

based on the match and the event entry, adjust one or more settings of the image capture device; and obtain a second image via the image capture device, the second image being based on the adjusted one or more settings.

2. The apparatus of claim 1, wherein, to adjust the one or more settings of the image capture device, the one or more processors are configured to modify a power mode of the image capture device.

3. The apparatus of claim 2, wherein, to modify the power mode of the image capture device, the one or more processors are configured to modify at least one of a framerate of the image capture device, a resolution of the image capture device, a binning mode of the image capture device, an imaging mode of the image capture device, and a number of image sensors invoked by at least one of the image capture device and the apparatus.

4. The apparatus of claim 3, wherein, to modify the power mode of the image capture device, the one or more processors are configured to:

based on a determination that a likelihood of an event of interest occurring in the environment is below a threshold, decrease at least one of the framerate, the resolution, the binning mode, the imaging mode, and the number of image sensors invoked.

5. The apparatus of claim 3, wherein, to modify the power mode of the image capture device, the one or more processors are configured to:

based on a determination that a likelihood of an event of interest occurring in the environment is above a threshold, increase at least one of the framerate, the resolution, the binning mode, the imaging mode, and the number of image sensors invoked.

6. The apparatus of claim 1, wherein the image capture device comprises a first image capture device, and wherein the one or more processors are configured to:

based on a determination that a likelihood of an event of interest occurring in the environment is above a threshold, increase a power mode of a second image capture device of the apparatus, wherein the second image capture device employs at least one of a higher-power mode than the first image capture device, a higher framerate than the first image capture device, a higher resolution than the first image capture device, a higher number of image sensors than the first image capture device, and a higher-power processing pipeline than a processing pipeline associated with the first image capture device.

7. The apparatus of claim 6, wherein, to increase the power mode of the second image capture device, the one or more processors are configured to initialize the second image capture device.

8. The apparatus of claim 1, wherein the event entry is stored in event data, wherein the event data contains a number of keyframes from detection events associated with the image capture device.

9. The apparatus of claim 8, wherein the event data further contains a respective count of detection events associated with each keyframe of the number of keyframes.

10. The apparatus of claim 8, wherein the one or more processors are configured to determine a likelihood of an event of interest occurring in the environment, and wherein, to determine the likelihood of the event occurring in the environment, the one or more processors are configured to:

determine the likelihood of the event occurring in the environment based on the match and one or more keyframes from the number of keyframes.

11. The apparatus of claim 9, wherein the one or more processors are configured to determine a likelihood of an event of interest occurring in the environment, and wherein, to determine the likelihood of the event occurring in the environment, the one or more processors are configured to determine the likelihood of the event occurring in the environment based on the match and the respective count of detection events associated with the keyframe.

12. The apparatus of claim 9, wherein the one or more processors are configured to:

in response to determining the match between one or more visual features extracted from the first image and one or more visual features associated with the keyframe, increase the respective count of detection events associated with the event entry.

13. The apparatus of claim 1, wherein the one or more processors are configured to:

obtain, via the image capture device, a different image depicting at least a portion of a different environment;

determine that one or more visual features extracted from the different image do not match visual features associated with any event entry in the memory; and create a second event entry in the memory corresponding to the different image, the second event entry being created in response to determining that the one or more visual features extracted from the different image do not match visual features associated with any event entry in the memory and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

14. The apparatus of claim 13, wherein the one or more processors are configured to:

determine that the event of interest was detected in the different image;

based on the determination that the event of interest was detected in the different image, determine a second likelihood of an additional event of interest occurring in the different environment; and adjust at least one setting of the image capture device based on the second likelihood of the additional event of interest occurring in the different environment.

15. The apparatus of claim 1, wherein the one or more settings of the image capture device comprise a framerate, and wherein the one or more processors are configured to:

determine the framerate based on a pre-determined framerate for detection events and a likelihood of an event of interest occurring in the environment; and maintain the framerate until at least an expiration of a configured period of time or a determination of a subsequent match between a different image captured by the image capture device and at least one event entry.

16. The apparatus of claim 15, wherein the one or more processors are configured to:
after expiration of the configured period of time or the determination of the subsequent match, adjust the framerate of the image capture device to a different framerate.

17. The apparatus of claim 16, wherein the different framerate comprises a default framerate or a particular framerate determined based on the pre-determined framerate and a second likelihood of detecting a particular event of interest associated with the subsequent match.

18. The apparatus of claim 1, wherein the one or more processors are configured to:
based on the match and the event entry, adjust one or more different settings of at least one of an active depth transmitter of the apparatus, an audio algorithm, a location service associated with at least one of a global navigation satellite (GNSS) system, a wireless location area network connection, and a global positioning system (GPS).

19. The apparatus of claim 18, wherein, to adjust the one or more different settings, the one or more processors are configured to turn off or implement at least one of the active depth transmitter, the audio algorithm, and the location service.

20. The apparatus of claim 1, wherein the one or more processors are configured to:
periodically decrease respective counts of detection events associated with the event entry.

21. The apparatus of claim 1, wherein the detection event comprises a detection of at least one of a face depicted by the keyframe, a hand gesture depicted by the keyframe, an emotion depicted by the keyframe, a scene depicted by the keyframe, one or more people depicted by the keyframe, an animal depicted by the keyframe, a machine-readable code depicted by the keyframe, an infrared light depicted by the keyframe, a two-dimensional surface depicted by the keyframe, and text depicted by the keyframe.

22. The apparatus of claim 1, wherein the event entry comprises a plurality of keyframes.

23. The apparatus of claim 1, wherein the one or more processors are configured to:
based on the match, determine a likelihood of an event of interest occurring in the environment; and
adjust the one or more settings of the image capture device further based on the likelihood of the event of interest occurring in the environment.

24. The apparatus of claim 23, wherein the one or more processors are further configured to:
determine the likelihood of the event further based on data from a non-image capture device of the apparatus; or
adjust the one or more settings of the image capture device further based on the data from the non-image capture device of the apparatus.

25. The apparatus of claim 1, wherein the apparatus comprises a mobile device.

26. The apparatus of claim 21, wherein the apparatus comprises an augmented reality device.

27. A method for obtaining an image, the method comprising:
obtaining, via an image capture device of an electronic device, a key frame depicting at least a portion of an environment;
identifying a detection event associated with the electronic device;
generating an event entry in the memory based on the keyframe and the detection event;
determining a match between one or more visual features extracted from a first image obtained via the image capture device and one or more visual features associated with the keyframe;
based on the match and the event entry, adjusting one or more settings of the image capture device; and
obtaining a second image via the image capture device, the second image being based on the adjusted one or more settings.

28. The method of claim 27, wherein adjusting the one or more settings of the image capture device comprises modifying a power mode of the image capture device.

29. The method of claim 28, wherein modifying the power mode of the image capture device comprises modifying at least one of a framerate of the image capture device, a resolution of the image capture device, a binning mode of the image capture device, an imaging mode of the image capture device, and a number of image sensors invoked by at least one of the image capture device and the electronic device.

30. The method of claim 29, wherein modifying the power mode of the image capture device comprises:
based on a determination that a likelihood of an event of interest occurring in the environment is below a threshold, decreasing at least one of the framerate, the resolution, the binning mode, the imaging mode, and the number of image sensors invoked.

31. The method of claim 29, wherein modifying the power mode of the image capture device comprises:
based on a determination that a likelihood of an event of interest occurring in the environment is above a threshold, increasing at least one of the framerate, the resolution, the binning mode, the imaging mode, and the number of image sensors invoked.

32. The method of claim 27, wherein the image capture device comprises a first image capture device, and wherein the method further comprises:
based on a determination that a likelihood of an event of interest occurring in the environment is above a threshold, increasing a power mode of a second image capture device of the electronic device, wherein the second image capture device employs at least one of a higher-power mode than the first image capture device, a higher framerate than the first image capture device, a higher resolution than the first image capture device, a higher number of image sensors than the first image capture device, and a higher-power processing pipeline than a processing pipeline associated with the first image capture device.

33. The method of claim 32, wherein increasing the power mode of the second image capture device comprises initializing the second image capture device.

34. The method of claim 27, wherein the event entry is stored in event data, wherein the event data contains a number of keyframes from detection events associated with the image capture device.

35. The method of claim 34, wherein the event data further contains a respective count of detection events associated with each keyframe of the number of keyframes.

36. The method of claim 34, further comprising:
determining a likelihood of an event of interest occurring in the environment based on the match and one or more keyframes from the number of keyframes.

37. The method of claim 35, further comprising determining a likelihood of an event of interest occurring in the environment based on the match and the respective count of detection events associated with the keyframe.

38. The method of claim 35, further comprising:
in response to determining the match between one or more visual features extracted from the first image and one or more visual features associated with the keyframe, increasing the respective count of detection events associated with the event entry.

39. The method of claim 27, further comprising:
obtaining, via the image capture device, a different image depicting at least a portion of a different environment;
determining that one or more visual features extracted from the different image do not match visual features associated with any event entry in the memory; and
creating a second event entry in the memory corresponding to the different image, the second event entry being created in response to determining that the one or more visual features extracted from the different image do not match visual features associated with any event entry in the memory and at least one of a determination that an event of interest was detected in the different image, a time elapsed since a last time a respective keyframe in the event data was created, and a time elapsed since a last time a respective match was identified between a particular keyframe in the event data and a particular image captured by the image capture device.

40. The method of claim 39, further comprising:
determining that the event of interest was detected in the different image;
based on the determination that the event of interest was detected in the different image, determining a second likelihood of an additional event of interest occurring in the different environment; and
adjusting at least one setting of the image capture device based on the second likelihood of the additional event of interest occurring in the different environment.

41. The method of claim 27, wherein the one or more settings of the image capture device comprise a framerate, and wherein the method further comprises:
determining the framerate based on a pre-determined framerate for detection events and a likelihood of an event of interest occurring in the environment; and
maintaining the framerate until at least an expiration of a configured period of time or a determination of a subsequent match between a different image captured by the image capture device and at least one event entry.

42. The method of claim 41, further comprising:
after expiration of the configured period of time or the determination of the subsequent match, adjusting the framerate of the image capture device to a different framerate.

43. The method of claim 42, wherein the different framerate comprises a default framerate or a particular framerate determined based on the pre-determined framerate and a second likelihood of detecting a particular event of interest associated with the subsequent match.

44. The method of claim 27, further comprising:
based on the match and the event entry, adjusting one or more different settings of at least one of an active depth transmitter of the electronic device, an audio algorithm, a location service associated with at least one of a global navigation satellite (GNSS) system, a wireless location area network connection, and a global positioning system (GPS).

45. The method of claim 44, wherein adjusting the one or more different settings comprises turning off or implementing at least one of the active depth transmitter, the audio algorithm, and the location service.

46. The method of claim 27, further comprising:
periodically decreasing respective counts of detection events associated with the event entry.

47. The method of claim 27, wherein the detection event comprises a detection of at least one of a face depicted by the keyframe, a hand gesture depicted by the keyframe, an emotion depicted by the keyframe, a scene depicted by the keyframe, one or more people depicted by the keyframe, an animal depicted by the keyframe, a machine-readable code depicted by the keyframe, an infrared light depicted by the keyframe, a two-dimensional surface depicted by the keyframe, and text depicted by the keyframe.

48. The method of claim 27, wherein the event entry comprises a plurality of keyframes.

49. The method of claim 27, further comprising:
based on the match, determining a likelihood of an event of interest occurring in the environment; and
adjusting the one or more settings of the image capture device further based on the likelihood of the event of interest occurring in the environment.

50. The method of claim 49, further comprising:
determining the likelihood of the event further based on data from a non-image capture device of the electronic device; or
adjusting the one or more settings of the image capture device further based on the data from the non-image capture device of the electronic device.

* * * * *